United States Patent
Yonezawa et al.

(10) Patent No.: US 11,647,844 B2
(45) Date of Patent: May 16, 2023

(54) CUSHION PAD

(71) Applicant: Archem Inc., Tokyo (JP)

(72) Inventors: Taisuke Yonezawa, Tokyo (JP);
Yoshiyuki Takahashi, Tokyo (JP);
Taichi Itabashi, Tokyo (JP); Yukiko Yamaguchi, Tokyo (JP)

(73) Assignee: Archem Inc., Tokyo (JP)

( * ) Notice: Subject to any disclaimer, the term of this patent is extended or adjusted under 35 U.S.C. 154(b) by 212 days.

(21) Appl. No.: 17/277,106

(22) PCT Filed: Sep. 20, 2019

(86) PCT No.: PCT/JP2019/037119
§ 371 (c)(1),
(2) Date: Mar. 17, 2021

(87) PCT Pub. No.: WO2020/059882
PCT Pub. Date: Mar. 26, 2020

(65) Prior Publication Data
US 2021/0368996 A1    Dec. 2, 2021

(30) Foreign Application Priority Data

Sep. 21, 2018    (JP) .............................. JP2018-177925

(51) Int. Cl.
*B60N 2/70*    (2006.01)
*A47C 27/14*    (2006.01)
*B60N 2/56*    (2006.01)

(52) U.S. Cl.
CPC .......... *A47C 27/144* (2013.01); *B60N 2/5621* (2013.01); *B60N 2/70* (2013.01)

(58) Field of Classification Search
CPC ...... A47C 27/144; B60N 2/5621; B60N 2/70; B60N 2/7011; B60N 2/646; B60N 2/643

USPC ..................................................... 297/452.47
See application file for complete search history.

(56) References Cited

U.S. PATENT DOCUMENTS 7,445,292 B2 * 11/2008 Moule .................... B60N 2/643
                                                    297/452.32
7,614,704 B2 * 11/2009 Whelan ................ A61G 5/1043
                                                    297/452.25

(Continued)

FOREIGN PATENT DOCUMENTS

CN    101090653 A    12/2007
CN    203472606 U    3/2014

(Continued)

OTHER PUBLICATIONS

Nov. 26, 2019, International Search Report issued in the International Patent Application No. PCT/JP2019/037119.

(Continued)

*Primary Examiner* — Mark R Wendell
(74) *Attorney, Agent, or Firm* — Kenja IP Law PC

(57) ABSTRACT

Provided is a cushion pad, in which a seating body portion of a seating portion has a bottomless or bottomed first hole arranged at a position at which the first hole overlaps a pair of ischial bones of a seated person in a horizontal projection plane and three or more bottomless or bottomed second holes with areas that are smaller than an area of the first hole in a horizontal projection plane, a center point O51 of the first hole is on or inside a triangle TR obtained by connecting center points of any three second holes from among the three or more second holes in the horizontal projection plane and in the seating portion, the inside of the first hole is a void space, or a soft material portion is arranged inside the first hole.

12 Claims, 16 Drawing Sheets

(56) References Cited

U.S. PATENT DOCUMENTS

| | | | | |
|---|---|---|---|---|
| 8,291,535 B2* | 10/2012 | Kemper | ............... | A61G 5/1045 5/655.9 |
| 9,604,549 B2 | 3/2017 | Makiguchi et al. | | |
| 10,561,246 B2* | 2/2020 | Kumagai | ................. | B60N 2/90 |
| 2010/0194171 A1* | 8/2010 | Hirata | .................. | B60N 2/3097 297/452.48 |
| 2014/0239678 A1* | 8/2014 | Todd | ....................... | B60N 2/643 297/180.12 |
| 2018/0020837 A1* | 1/2018 | Cheng | .................... | A47C 27/15 297/452.42 |

FOREIGN PATENT DOCUMENTS

| | | |
|---|---|---|
| CN | 203510813 U | 4/2014 |
| CN | 204393873 U | 6/2015 |
| CN | 204797303 U | 11/2015 |
| JP | 2002045259 A | 2/2002 |
| JP | 2004016312 A | 1/2004 |
| JP | 2008302085 A | 12/2008 |
| JP | 2009112582 A | 5/2009 |
| JP | 2011147542 A | 8/2011 |
| TW | M532792 U | 12/2016 |

OTHER PUBLICATIONS

Apr. 6, 2022, search result of Office Action issued by the China National Intellectual Property Administration in the corresponding Chinese Patent Application No. 201980061466.3.

Mar. 23, 2021, International Preliminary Report on Patentability issued in the International Patent Application No. PCT/JP2019/037119.

* cited by examiner

A-A SECTIONAL VIEW

C-C SECTIONAL VIEW

D-D SECTIONAL VIEW

E-E SECTIONAL VIEW

COMPARATIVE EXAMPLE 2

EXAMPLE 1

CUSHION PAD

TECHNICAL FIELD

The present disclosure relates to a cushion pad that is suitably used in a seat pad for a vehicle.

The present application claims priority on Japanese Patent Application No. 2018-177925, filed in Japan on Sep. 21, 2018, the entire content of which is incorporated herein by reference.

BACKGROUND

As a cushion pad in the related art, there is a cushion pad provided with a bottomed recessed portion or a through hole at a position in a seating portion for supporting a seated person, the position corresponding to a pair of ischial bones of the seated person (Patent Literature 1, for example).

CITATION LIST

Patent Literature

PTL 1: Japanese Patent Laid-Open No. 2002-45259

SUMMARY

Technical Problem

However, there is still room for further improvement in sitting comfort of the cushion pad in Patent Literature 1.

An object of the present disclosure is to provide a cushion pad capable of improving sitting comfort.

Solution to Problem

A cushion pad according to the present disclosure includes: a seating portion configured to support a seated person, in which the seating portion has a seating body portion formed of a first resin foam body, the seating body portion includes a bottomless or bottomed first hole arranged at a position at which the first hole overlaps a pair of ischial bones of the seated person in a horizontal projection plane, and three or more bottomless or bottomed second holes with areas that are smaller than an area of the first hole in a horizontal projection plane, a center point of the first hole is located on or inside a triangle obtained by connecting center points of any three second holes from among the three or more second holes in a horizontal projection plane, and in the seating portion, inside of the first hole is a void space, or a soft material portion formed of a second resin foam body that is softer than the first resin foam body is arranged inside the first hole.

Advantageous Effect

According to the present disclosure, it is possible to provide a cushion pad capable of improving sitting comfort.

DETAILED DESCRIPTION

A cushion pad according to the present disclosure can be suitably used for a seat pad for a vehicle. Also, the cushion pad according to the present disclosure can be used for an arbitrary type of vehicle.

Hereinafter, embodiments of the cushion pad according to the present disclosure will be described as examples with reference to the drawings. In each drawing, the same reference signs are applied to common components. Hereinafter, a seat pad for a vehicle will also simply be referred to as a "seat pad".

Figure 1:
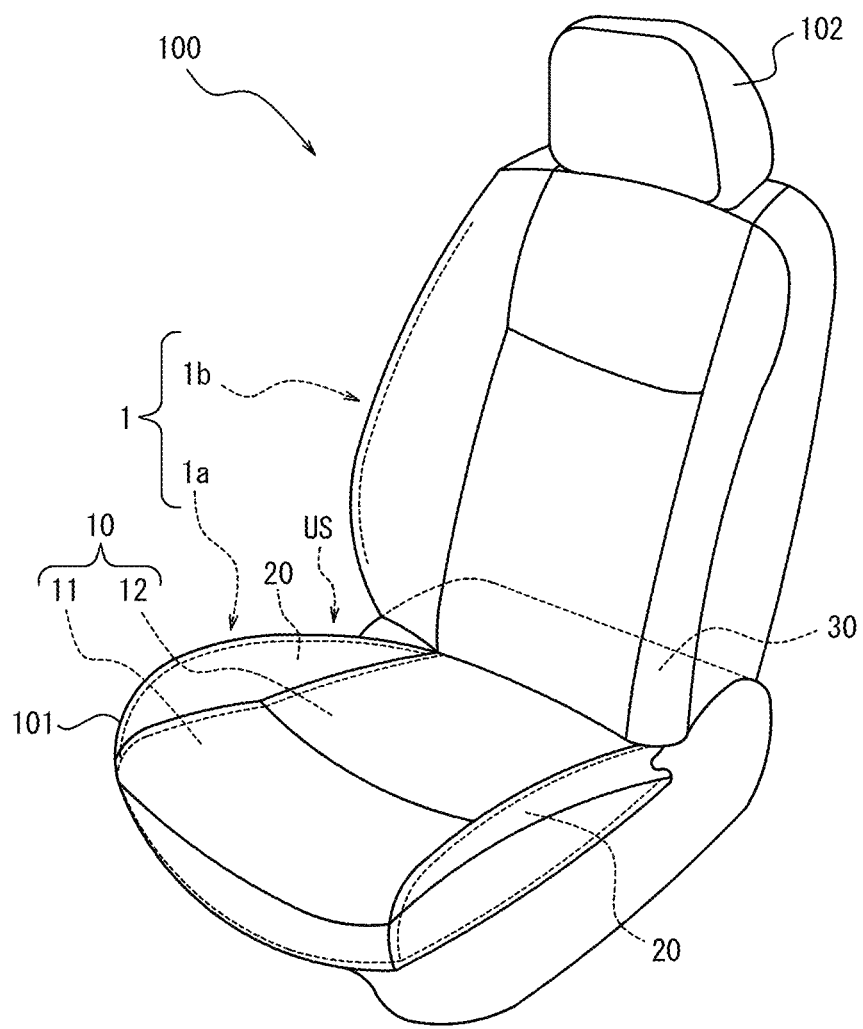
FIG. 1 is a perspective view illustrating a seat for a vehicle provided with a cushion pad according to a first embodiment of the present disclosure.
Figure 1:
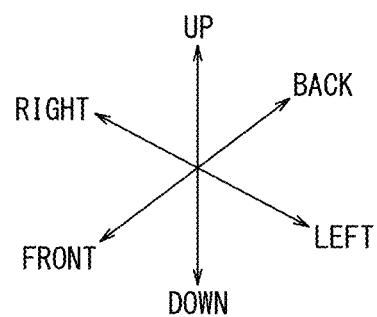

FIG. 1 illustrates a seat for a vehicle 100 including a cushion pad 1a according to a first embodiment of the present disclosure. The seat for a vehicle 100 includes a seat pad 1. As represented by the dashed line in FIG. 1, the seat pad 1 includes the cushion pad 1a according to the embodiment configured to seat a seated person and a back pad 1b configured to support the back of the seated person. The seat for a vehicle 100 includes, in addition to the seat pad 1, a surface skin 101 configured to cover the seat pad 1 on the front side (the side of the seated person), a frame (not illustrated) configured to support the cushion pad 1a from the lower side, a frame (not illustrated) placed on the back side of the back pad 1b, and a headrest 102 placed above the back pad 1b and configured to support the head part of the seated person, for example. The surface skin 101 is configured with a material (such as a cloth) with satisfactory air permeability, for example. Each of the cushion pad 1a and the back pad 1b is formed with a resin foam body. The resin foam body (including a first resin foam body and a second resin foam body, which will be described later) configuring the cushion pad 1a and the back pad 1b is preferably a soft resin foam body and is more preferably soft polyurethane foam. The cushion pad 1a and the back pad 1b can be configured as members separated from each other.

In the specification, directions such as "up", "down", "left", "right", "front", and "back" when seen from the seated person who is being seated in the cushion pad 1a will be simply referred to as "up", "down", "left", "right", "front", and "back", respectively as illustrated in each drawing.

Hereinafter, the cushion pad 1a rather than the back pad 1b in the seat pad 1 will be described.

Figure 2:
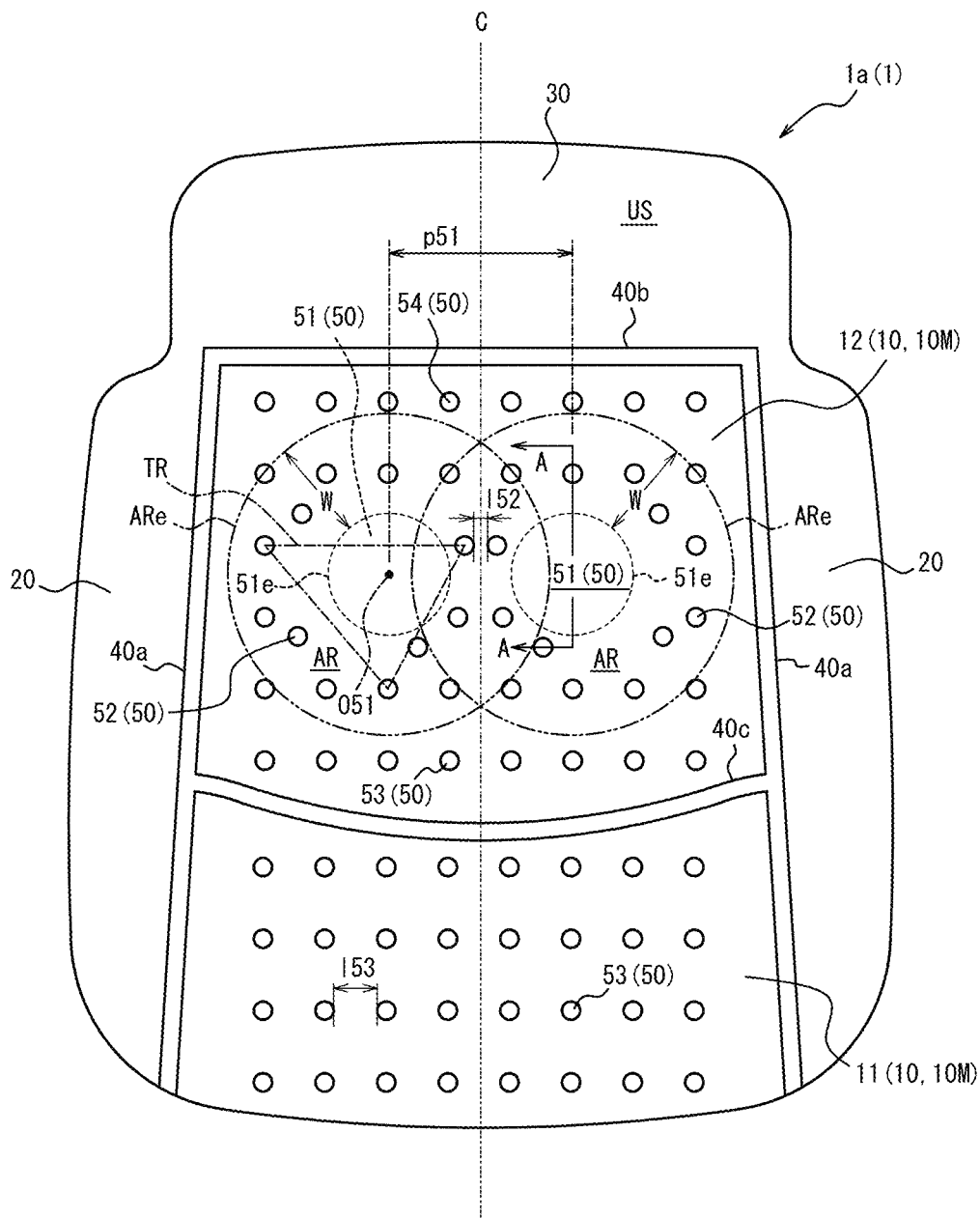
FIG. 2 is a plan view illustrating how the cushion pad in FIG. 1 looks like when the cushion pad is seen from the upper side.

FIG. 2 is a plan view illustrating how the cushion pad 1a of the seat pad 1 in FIG. 1 looks like when seen from the upper side, in other words, a horizontal projection diagram illustrating how the cushion pad 1a projected to a horizontal projection plane looks like. As illustrated in FIGS. 1 and 2, the cushion pad 1a has a seating portion (also referred to as a "main pad portion") 10 configured to support the seated person from the lower side, a pair of side pad portions 20 located on both left and right sides of the seating portion 10, projecting upward beyond the seating portion 10, and configured to support the seated person from both left and right sides, and a back pad facing portion 30 located on the back side beyond the seating portion 10 and configured to be arranged to face the back pad 1b in an up-down direction.

The seating portion 10 includes a below-thigh portion 11 configured to support the thigh parts of the seated person from the lower side and a below-buttocks portion 12 located on the back side relative to the below-thigh portion 11 and configured to support the buttocks of the seated person from the lower side.

In the example in FIG. 2, a groove 40a extending substantially in the front-back direction between the seating portion 10 and the side pad portions 20, a groove 40b extending substantially in the left-right direction between the seating portion 10 and the back pad facing portion 30, and a groove 40c extending substantially in the left-right direction inside the seating portion 10 are respectively provided in an upper surface (front surface) US of the cushion pad 1a. Attachment tools (not illustrated) to attach the surface skin 101 (FIG. 1) to the cushion pad 1a are arranged inside the grooves 40a, 40b, and 40c. In the example in FIG. 2, a boundary line between the seating portion 1 and the side pad portions 20 is a groove width center line of the groove 40a therebetween, and a boundary line between the seating portion 10 and the back pad facing portion 30 is a groove width center line of the groove 40b therebetween, in a horizontal projection plane.

However, the grooves 40a and 40b may be located at positions different from the boundary line between the seating portion 10 and the side pad portions 20 and the boundary line between the seating portion 10 and the back pad facing portion 30. However, the grooves 40a to 40c may not be provided in the upper surface US of the cushion pad 1a.

In the embodiment, the seating portion 10 is configured only with a seating body portion 10M formed of the first resin foam body.

Figure 13:
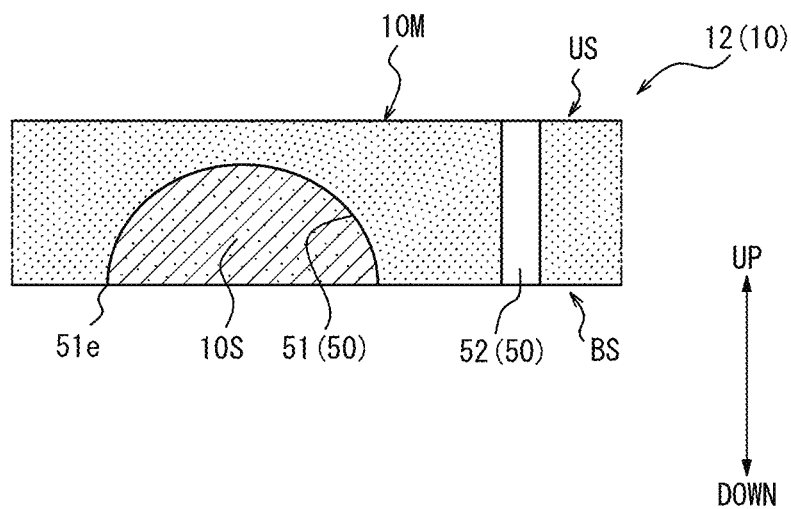
FIG. 13 is a sectional view illustrating a part of a cushion pad according to a seventh embodiment of the present disclosure.
Figure 14:
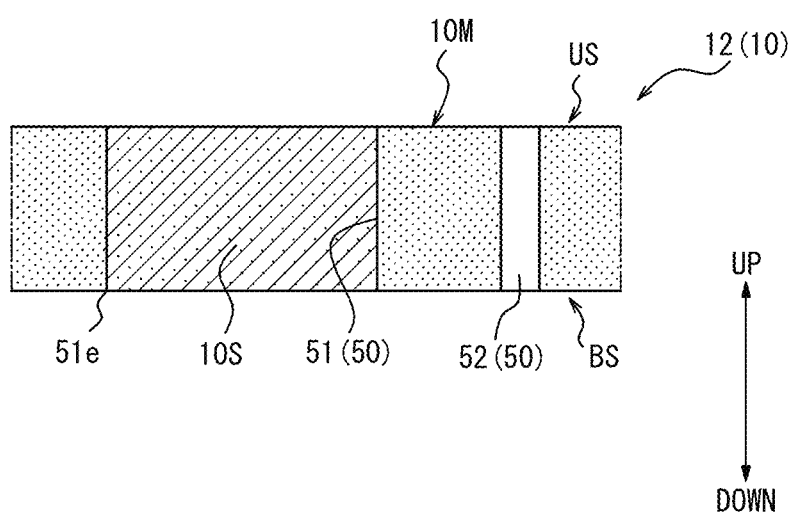
FIG. 14 is a sectional view illustrating a part of a cushion pad according to an eighth embodiment of the present disclosure.

Note that the seating body portion 10M is distinguished from a soft material portion 10S formed of the second resin foam body, which will be described later in a seventh embodiment (FIG. 13) and an eighth embodiment (FIG. 14). However, the first resin foam body configuring the seating body portion 10M is not limited to a case in which the composition and the foaming rate are uniform, and the composition and the foaming rate may be different depending on parts of the seating body portion 10M.

In this example, the cushion pad 1a has a thinner thickness than a general cushion pad in the related art. Specifically, a maximum value (a thickness T at a portion where the thickness in the up-down direction becomes a maximum value) of the thickness T (FIG. 3B) of the cushion pad 1a in the up-down direction is 60 mm or less.

It is thus possible to reduce the weight. The weight reduction of the cushion pad 1a leads to an improvement in fuel efficiency of the vehicle and thus energy saving.

In terms of weight reduction, the maximum value of the thickness T of the cushion pad 1a in the up-down direction is preferably 55 mm or less.

On the other hand, in terms of securing sitting comfort, the maximum value of the thickness T of the cushion pad 1a in the up-down direction is preferably 40 mm or more and is more preferably 45 mm or more.

However, the cushion pad 1a may not be thin, and the maximum value of the thickness T in the up-down direction may exceed 60 mm.

Figure 3A:
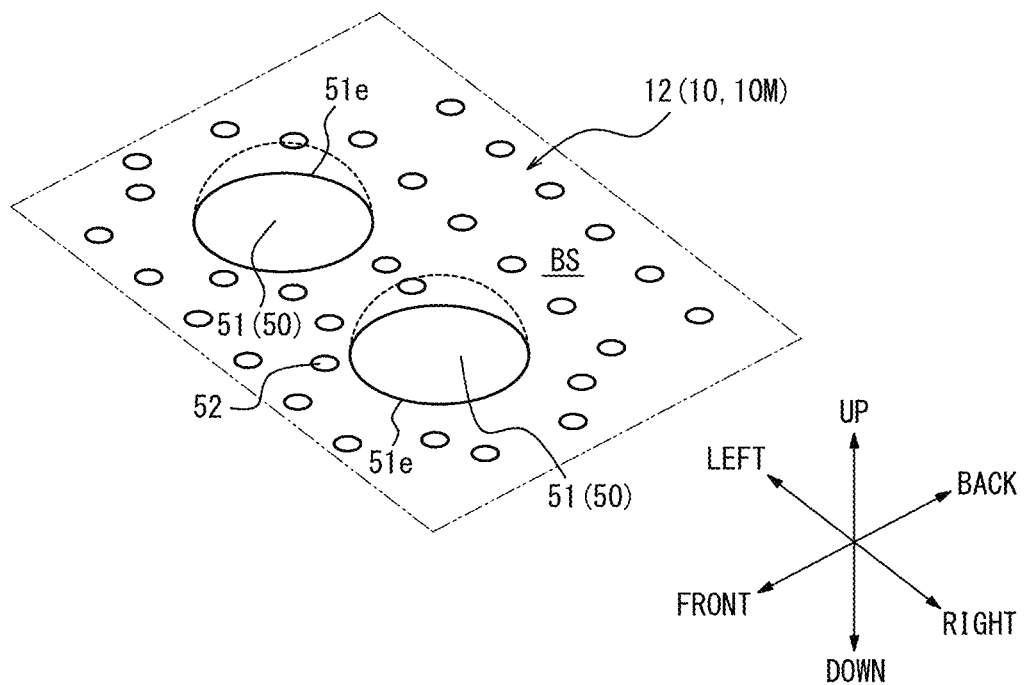
FIG. 3A is a perspective view illustrating a part of a back surface of the cushion pad in FIG. 2.
Figure 3B:
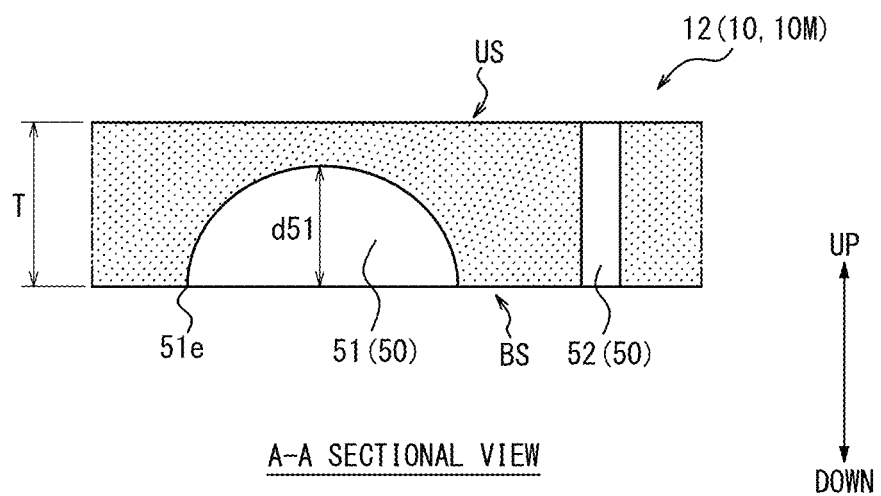
FIG. 3B is an A-A sectional view illustrating a part of the cushion pad in FIG. 2 from a section along the line A-A in FIG. 2.

FIG. 3A is a perspective view illustrating a part of a back surface BS of the cushion pad 1a in FIG. 2, and FIG. 3B is an A-A sectional view illustrating a part of the cushion pad in FIG. 2 from the section along the line A-A in FIG. 2. As illustrated in FIGS. 2 and 3, the seating body portion 10M has a plurality of bottomless or bottomed holes 50.

In regard to the holes 50, "bottomless" means that the holes 50 are through holes, that is, "bottomless" means that the holes 50 penetrate through the seating body portion 10M. Also, in regard to the holes 50, "bottomed" means that the holes 50 are dents, that is, "bottomed" means that ends of the holes 50 on one side are opened in any one of the surfaces of the seating body portion 10M while ends (bottom portions) of the hole 50 on the other side are not opened in both surfaces of the seating body portion 10M and end inside the seating body portion 10M.

Since the seating body portion 10M has the plurality of holes 50, it is possible to reduce the weight, to improve air permeability, and to reduce heat storage and the like of the cushion pad 1a as compared with a case in which the seating body portion 10M does not have the holes 50. The weight reduction of the cushion pad 1a leads to an improvement in fuel efficiency of the vehicle and thus energy saving. The improvement in air permeability and the reduction of heat storage of the cushion pad 1a lead to an improvement in effectiveness of air conditioner inside the vehicle and thus energy saving.

In the example illustrated in FIGS. 2 and 3, the plurality of holes 50 provided in the seating body portion 10M includes one or two (two in the example in the drawings) bottomless or bottomed (bottomed in the example in the drawings) first holes 51, three or more bottomless or bottomed (bottomless in the example in the drawings) second holes 52, one or multiple (multiple in the example in the drawings) bottomless or bottomed (bottomless in the example in the drawings) third holes 53, and one or multiple (multiple in the example in the drawings) bottomless or bottomed (bottomless in the example in the drawings) fourth holes 54. However, it is only necessary for the seating body portion 10M to have at least the first holes 51 and the second holes 52, and the seating body portion 10M may not have the third holes 53 and the fourth holes 54.

In a horizontal projection plane, the two first holes 51 are separated from each other in the left-right direction at the below-buttocks portion 12 of the seating portion 10 and are located on both sides of a virtual line (hereinafter, referred to as a "center line in the left-right direction") C passing through the center of the seating portion 10 in the left-right direction. More specifically, the two first holes 51 are arranged at positions at which the first holes 51 overlaps a pair of ischial bones of the seated person when the seated person is seated in the seating portion 10, in the horizontal projection plane.

In the specification, the positions of the "pair of ischial bones of the seated person" in the horizontal projection plane are positions of parts at which the highest sitting pressure is applied in the cushion pad in the horizontal projection plane when a 3D mannequin (a three-dimensional sitting position human body model for measuring dimensions inside vehicle (3DM-JM 50)) defined by JIS D 4607 is seated on a cushion pad in which all the plurality of holes 50 provided in the seating body portion 10M of the cushion pad 1a are filled with the first resin foam body.

As illustrated in FIG. 3, each first hole 51 is a bottomed dent that is opened in the back surface BS of the seating body portion 10M in this example. The inside of the first holes 51 is void spaces, and nothing is provided therein. As illustrated in FIG. 2, an outer edge 51e of each first hole 51 has a circular shape in the horizontal projection plane. As illustrated in FIG. 3, each first hole 51 has a curved shape projecting upward in the section in the vertical direction (up-down direction). Each first hole 51 has an area and a diameter gradually decreasing from the back surface BS to the upper surface US of the seating body portion 10M.

However, the first hole 51 may have an arbitrary shape in the section in the vertical direction, may have, for example, a substantially triangular shape or a substantially trapezoidal shape projecting upward, and may have an area and a diameter gradually decreasing from the back surface BS to the upper surface US of the seating body portion 10M. Alternatively, the first hole 51 may have a substantially square shape in the section in the vertical direction and may thus have uniform (constant) area and diameter in the up-down direction.

As illustrated in FIG. 2, a center point O51 of each first hole 51 is surrounded by at least any three second holes 52 from among the three or more second holes 52 provided in the seating portion 10 in the horizontal projection plane. More specifically, the center point O51 of each first hole 51 is on (on the boundary line of a triangle TR) or inside (inside the boundary line of the triangle TR) of the triangle TR obtained by connecting the center points of any three second holes 52 from among the three or more second holes 52 provided in the seating portion 10, in the horizontal projection plane. Although the first holes 51 are on or inside the plurality of triangles TR, respectively, in the example in FIG. 2, only one triangle TR is illustrated in FIG. 2 for convenience.

Note that in the specification, the "center points" of the holes 50 (the first holes 51, the second holes 52, the third holes 53, and the fourth holes 54) indicate center points of circumscribed circles of the holes 50 in the horizontal projection plane in a case in which the holes 50 have non-circular shapes in the horizontal projection plane.

As illustrated in FIG. 2, three or more second holes 52 are arranged in each annular region AR with a width W surrounding the outside of the outer edge 51e of each first hole 51 in the horizontal projection plane. In the specification, the second holes 52 are assumed to be the holes 50 located inside the annular regions AR from among the plurality of holes 50 provided in the seating body portion 10M. The holes 50 located on the outer edges 51e of the annular regions AR are also assumed to be the second holes 52. The annular regions AR are annular regions between the outer edges 51e of the first holes 51 and virtual annular lines (outer edges of the annular regions AR) ARe separated outward from the outer edge 51e of the first holes 51 by the width W. One annular region AR is provided for one first hole 51. In the example in FIG. 2, two annular regions AR are provided. The width W of the annular regions AR is measured along a vertical line to the outer edges 51e of the first holes 51. The width W of the annular regions AR is uniform over the entire annular regions AR.

The width W of the annular regions AR (first annular regions) is 80 mm.

Note that the three or more second holes 52 are preferably arranged near the first holes 51. In this regard, the three or more second holes 52 are preferably arranged inside the annular regions (second annular regions; not illustrated) with a width of 60 mm surrounding the outside of the outer edges 51e of the first holes 51, and the three or more second holes 52 are more preferably arranged inside the annular regions (third annular regions; not illustrated) with a width of 40 mm surrounding the outside of the outer edges 51e of the first holes 51.

As illustrated in FIG. 3, each second hole 52 is a through hole penetrating through the seating body portion 10M in the up-down direction in this example. As illustrated in FIG. 2, each second hole 52 has a circular shape in the horizontal projection plane in this example. As illustrated in FIG. 3, each second hole 52 linearly extends in parallel to the up-down direction in the section in the vertical direction. Each second hole 52 has uniform (constant) area and diameter in the up-down direction.

In the horizontal projection plane in the example in FIG. 2, each second hole 52 has an area that is smaller than the area of each first hole 51. Here, the "areas" of the holes 50 (the first holes 51, the second holes 52, the third holes 53, and the fourth holes 54) in the horizontal projection plane are areas of the regions occupied by the holes 50 when the horizontal projection plane is seen rather than the areas of the holes 50 at a specific position (such as at the upper surface US or the back surface BS) in the up-down direction unless particularly indicated otherwise. For example, the area of each first hole 51 in the horizontal projection plane corresponds to the area of each first hole 51 in the back surface BS of the seating body portion 10M in the example in FIG. 2.

Similarly, each second hole 52 has a diameter that is smaller than the diameter of each first hole 51 in the horizontal projection plane in the example in FIG. 2.

Here, the "diameters" of the holes 50 (the first hole 51, the second holes 52, the third holes 53, and the fourth holes 54) in the horizontal projection plane are diameters of the regions occupied by the holes 50 when the horizontal projection plane is seen rather than the diameters of the holes 50 at a specific position (such as at the upper surface US or the back surface BS) in the up-down direction unless particularly indicated otherwise. For example, the diameter of each first hole 51 in the horizontal projection plane corresponds to the diameter of each first hole in the back surface BS of the seating body portion 10M in the example in FIG. 2.

The holes 50 arranged on the front side beyond the annular regions AR in the horizontal projection plane from among the plurality of holes 50 provided in the seating body portion 10M are the third holes 53.

The holes 50 arranged on both left and right sides or on the back side beyond the annular regions AR in the horizontal projection plane from among the plurality of holes 50 provided in the seating body portion 10M are the fourth holes 54.

In the example in FIG. 2, the third holes 53 and the fourth holes 54 have similar configurations as the configuration of the second holes 52. In other words, each third hole 53 and each fourth hole 54 are through holes penetrating through the seating body portion 10M in the up-down direction. As illustrated in FIG. 2, each third hole 53 and each fourth hole 54 have circular shapes in the horizontal projection plane in this example. Although illustration is omitted, each third hole 53 and each fourth hole 54 linearly extend in parallel to the up-down direction in the section in the vertical direction. Each third hole 53 and each fourth hole 54 have uniform (constant) areas and diameters in the up-down direction.

Note that the areas, the diameters, the shapes, and the like of the second holes 52, the third holes 53, and the fourth holes 54 in the horizontal projection plane may be different from each other.

Although each of the shapes of the holes 50 (the first holes 51, the second holes 52, the third holes 53, and the fourth holes 54) in the horizontal projection plane is a circular shape (perfect circle) in the example in FIG. 2, the shapes may be any other arbitrary shapes such as oval shapes, or polygonal shapes such as triangular shapes, square shapes, rhomboidal shapes, or trapezoidal shapes, for example.

The arrangement pattern and the number of second holes 52, and the diameters, the areas, the shapes, and the like thereof in the horizontal projection plane may be arbitrarily set as long as the area of each second hole 52 is set to be smaller than the area of each first hole 51 in the horizontal projection plane. Also, the arrangement patterns and the numbers of the third holes 53 and the fourth holes 54, and the diameters, the areas, the shapes, and the like thereof in the horizontal projection plane may be arbitrarily set. In terms of an improvement in sitting comfort, the areas and the diameters of the third holes 53 and the fourth holes 54 in the horizontal projection plane are preferably set to be smaller than the areas and the diameters of the first holes 51. Also, in terms of an improvement in sitting comfort, the arrangement pattern of the holes 50 is preferably symmetric with respect to the center line C of the seating portion 10 in the left-right direction.

Note that in the specification, the "diameters" of the holes 50 (the first holes 51, the second holes 52, the third holes 53, and the fourth holes 54) indicate the diameters of the circumscribed circles of the holes 50 in the horizontal projection plane in a case in which the holes 50 have non-circular shapes in the horizontal projection plane.

As a method for forming the holes 50 in the seating body portion 10M, a method of providing projections in at least one of mold surfaces of an upper mold piece for molding the back surface BS of the cushion pad 1a and a lower mold piece for molding the upper surface US of the cushion pad 1a of a mold for foam-molding the cushion pad 1a such that the holes 50 are molded by the surfaces of the projections in a state in which the upper mold piece and the lower mold piece are attached, for example, is suitably used. However, the holes 50 may be formed by a method that is different from this method.

Next, operational effects of the first embodiment will be described.

Generally, the sitting pressure increases at and around the ischial bones of the seated person as compared with the other parts, and in particular, the sitting pressure becomes the highest at the positions of the ischial bones, in sitting pressure distribution when the seated person is seated in a cushion pad with no holes provided therein.

In the embodiment, since the first holes 51 are arranged at the positions at which the first holes 51 overlaps the pair of ischial bones of the seated person in the horizontal projection plane, it is possible to significantly reduce the sitting pressure immediately below the pair of ischial bones where the sitting pressure is most likely to increase when the seated person is seated as compared with a case in which there are no first holes 51 (a case in which the first holes 51 are filled with the first resin foam body). It is thus possible to improve sitting comfort.

Also, in a case in which the first holes 51 are provided while no second holes 52 are provided (a case in which the second holes 52 are filled with the first resin foam body) as in Patent Literature 1, for example, large tension is applied to the side of the upper surface US in the vicinity of the outer edges 51e of the first holes 51 when the seated person is seated, the sitting pressure in the surroundings of the ischial bones of the seated person increases, and as a result, the seated person is likely to have a feeling of tension in the surroundings of the ischial bones.

On the other hand, according to the embodiment, since each first hole 51 is surrounded by at least any three second holes 52 in the horizontal projection plane, and specifically, the center point O51 of the first hole 51 is on or inside the triangle TR obtained by connecting the center points of the at least any three second holes 52, a load applied to the surroundings of the pair of ischial bones of the seated person is dispersed, and it is possible to reduce the sitting pressure in the surroundings of the ischial bones and thus the feeling of tension and to further improve sitting comfort. Also, it is possible to improve the void space rate of the cushion pad 1a by the second holes 52 provided as compared with a case in which there are no second holes 52 and thereby to achieve weight reduction, an improvement in air permeability, reduction of heat storage, and the like. The weight reduction of the cushion pad 1a leads to an improvement in fuel efficiency of the vehicle and thus energy saving. The improvement in air permeability and reduction of heat storage of the cushion pad 1a lead to improvement in effectiveness of the air conditioner in the vehicle and thus energy saving.

Note that since the cushion pad 1a is formed to be thin as described above in the embodiment, the sitting pressures at and around the ischia bones of the seated person himself/herself are particularly likely to increase, and the seated person is particularly likely to have a feeling of bottoming when the seated person is seated in a case in which the holes 50 are not provided in the cushion pad 1a as compared with a general cushion pad in the related art which is not formed to be thin. Therefore, in a case in which the cushion pad 1a is formed to be thin as in the embodiment, it is possible to reduce the feeling of bottoming and to improve sitting comfort due to a sitting pressure reduction effect exhibited by the first holes 51 and the second holes 52 as described above, and the first holes 51 and the second holes 52 are thus particularly advantageous.

Also, since each second hole 52 has the area that is smaller than the area of each first hole 51, it is possible to prevent the below-buttocks portion 12 of the seating portion 10 from becoming excessively soft as compared with the case in which each second hole 52 has an area that is equal to or greater than the area of each first hole 51, thereby to prevent the buttocks of the seated person from sinking therein, and to firmly support the buttocks of the seated person. It is thus possible to improve sitting comfort. Also, since the center point O51 of each first hole 51 is on or inside the triangle TR obtained by connecting the center points of the at least any three second holes 52 in the horizontal projection plane, it is possible to uniformly reduce the sitting pressure in the surroundings of the ischial bones of the seated person in a further unbiased manner as compared with a case in which the center point O51 of the first hole 51 is outside the triangle TR obtained by connecting the center points of the three second holes 52.

Also, since the three or more second holes 52 are arranged in the annular region AR in the surrounding of each first hole 51 in the example in FIG. 2, a load applied to the surroundings of the pair of ischial bones of the seated person is dispersed, and it is possible to reduce the sitting pressure and thus a feeling of tension in the surroundings of the ischial bones and to further improve sitting comfort as compared with a case in which only two or less second holes 52 are provided inside each annular region AR.

From a similar viewpoint, the center point O51 of each first hole 51 is preferably located on or inside the triangle TR obtained by connecting the center points of the at least any three second holes 52 from among the three or more second holes 52 in the annular region (first annular region) AR in the surroundings of each first hole 51 as in the example in FIG. 2. Also, the center point O51 of each first hole 51 is more preferably located on or inside the triangle TR obtained by connecting the center points of the at least any three second holes 52 from among the three or more second holes 52 in the second annular region in the surroundings of each first hole 51. Moreover, the center point O51 of each first hole 51 is further preferably located on or inside the triangle TR obtained by connecting the center points of the at least any three second holes 52 from among the three or more second holes 52 in the third annular region in the surroundings of each first hole 51.

In the example in FIG. 2, the first holes 51 are bottomed dents which are opened in the back surface BS of the seating body portion 10M as described above. In other words, the first holes 51 are not opened in the upper surface US of the seating body portion 10M, and the bottom portions of the first holes 51 are located between the upper surface US and the back surface BS of the seating body portion 10M. Also, the inside of the first holes 51 is void spaces. It is also possible to reduce the sitting pressure immediately below the ischial bones of the seated person by the first holes 51 in this case as well similarly to a case in which the first holes 51 are bottomed holes which are opened in the upper surface US of the seating body portion 10M and a case in which the first holes 51 are bottomless holes which penetrate through the seating body portion 10M in the up-down direction.

In this case, the seated person is more unlikely to have a feeling of discomfort due to the presence of the first holes 51 when the seated person is seated as compared with the case in which the first holes 51 are bottomed holes which are opened in the upper surface US of the seating body portion 10M or the case in which the first holes 51 are bottomless holes which penetrate through the seating body portion 10M in the up-down direction. It is thus possible to improve sitting comfort.

However, the first holes 51 may be bottomed holes which are opened in the upper surface US of the seating body portion 10M, or the first holes 51 may be bottomless holes which penetrate through seating body portion 10M in the up-down direction.

In the example in FIG. 2, since the seating body portion 10M further includes the third holes 53 arranged on the front side beyond the annular regions AR and the fourth holes 54 arranged on both left and right sides or the back side beyond the annular regions AR in the horizontal projection plane, it is possible to more uniformly arrange the holes 50 over the entire seating body portion 10M, thereby to improve a balance between hardness of the parts outside the annular regions AR in the seating portion 10 and hardness of the parts inside the annular regions AR in the seating portion 10, and to further improve sitting comport as compared with a case in which there are neither third holes 53 nor the fourth holes 54.

More specifically, it is possible to soften the below-thigh portion 11 of the seating portion 10, to reduce the sitting pressure immediately below the pair of thighs of the seated person, and to improve sitting comfort by including the third holes 53.

Also, it is possible to soften an outer edge-side part of the below-buttocks portion 12 of the seating portion 10, to reduce the sitting pressure immediately below outer edge-side parts of the buttocks of the seated person, and to improve sitting comfort by including the fourth holes 54.

As described above, the second holes 52, the third holes 53, and the fourth holes 54 are bottomless holes, that is, through-holes penetrating through the seating body portion 10M in the up-down direction in the example in FIG. 2. In this manner, it is possible to reduce the sitting pressure, to improve sitting comfort, and to realize weight reduction, an improvement in air permeability, reduction of heat storage, and the like as compared with a case in which the second holes 52, the third holes 53, and the fourth holes 54 are bottomed holes. However, the second holes 52, the third holes 53, and the fourth holes 54 may be bottomed holes, and in that case, the second holes 52, the third holes 53, and the fourth holes 54 may be opened in the back surface BS of the seating body portion 10M or may be opened in the upper surface US of the seating body portion 10M.

Hereinafter, second to ninth embodiments of the present disclosure will be described. The second to ninth embodiments are different from the first embodiment mainly in the shape of first holes 51. Since the other configurations (second holes 52, third holes 53, fourth holes 54, and the like) are similar to those in the first embodiment, description thereof will be omitted. In the second to ninth embodiments, similarly to the first embodiment, each center point O51 of each first hole 51 is located on or inside a triangle TR obtained by connecting center points of at least any three second holes 52 in a horizontal projection plane. Also, the three or more second holes 52 are arranged in an annular region AR in the surroundings of each first hole 51. In addition, the center point O51 of each first hole 51 is located on or inside the triangle TR obtained by connecting the center points of the at least any three second holes 52 from among the three or more second holes 52 located in the annular region (first annular region) AR in the surroundings of each first hole 51.

Figure 4:
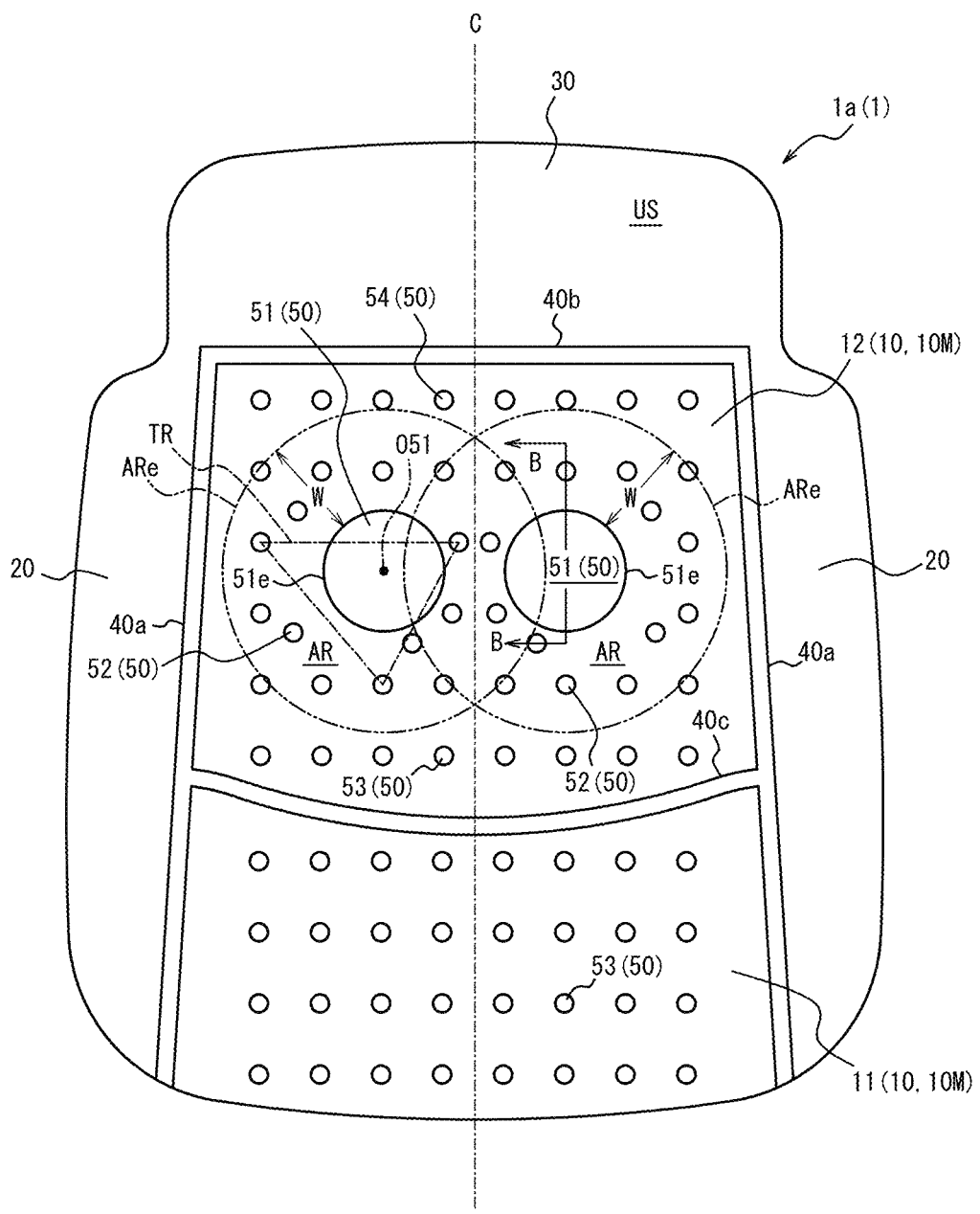
FIG. 4 is a plan view illustrating how a cushion pad according to a second embodiment of the present disclosure looks like when the cushion pad is seen from the upper side.
Figure 4:
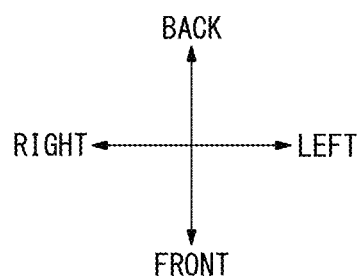
Figure 5:
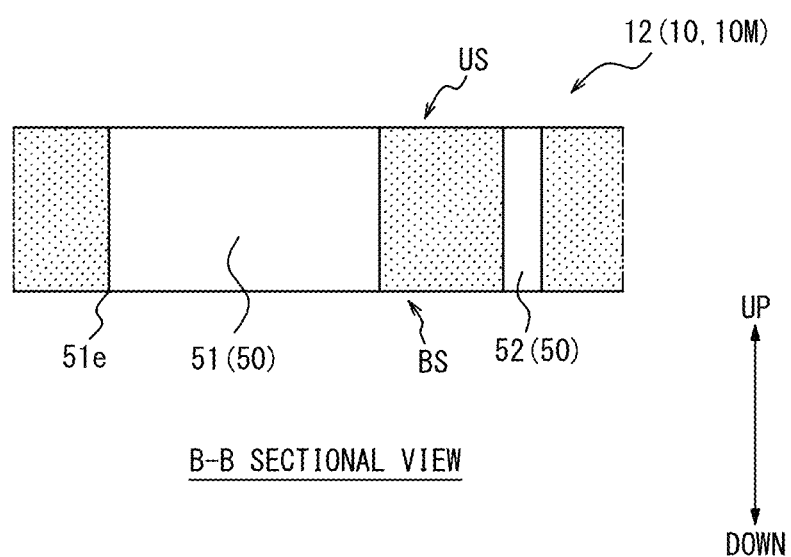
FIG. 5 is a B-B sectional view illustrating a part of the cushion pad in FIG. 4 from a section along the line B-B in FIG. 4.

In the second embodiment illustrated in FIGS. 4 and 5, the first holes 51 are bottomless holes which are through-holes penetrating through a seating body portion 10M in the up-down direction.

According to the second embodiment, it is possible to reduce the hitting pressure immediately below ischial bones of a seated person, to increase a void space rate, and thereby to realize weight reduction, an improvement in air permeability, reduction of heat storage, and the like as compared with a case in which the first holes 51 are bottomed holes as in the first embodiment illustrated in FIGS. 2 and 3, for example.

Note that although the shape of each first hole 51 in the horizontal projection plane is a circular shape (perfect circular) in the example in FIGS. 4 and 5, the shape may be any other arbitrary shape such as an oval shape or a polygonal shape such as a triangular shape, a square shape, a rhomboidal shape, or a trapezoidal shape, for example, in the second embodiment.

Also, in the example in FIG. 5, a wall surface of the first hole 51 in a section in the vertical direction is parallel to the vertical direction. Therefore, the first hole 51 has constant area and diameter in the up-down direction. However, the wall surface of the first hole 51 in the section in the vertical direction may be inclined or curved with respect to the vertical direction, for example. In that case, the first holes 51 may have areas and diameters gradually decreasing or may have areas and diameters gradually increasing from the back surface BS toward the upper surface US of the seating body portion 10M.

Note that although illustration will be omitted, the areas of the first holes 51 in the back surface BS of the seating portion 10 are preferably larger than the areas thereof in the upper surface US of the seating portion 10 in the horizontal projection plane. In this manner, it is possible to reduce the sitting pressure immediately below the ischial bones and to improve sitting comfort by the first holes 51, and to reduce a feeling of discomfort that the seated person may have due to the presence of the first holes 51, as compared with a case in which the areas of the first holes 51 in the back surface BS of the seating portion 10 is equal to or greater than the area thereof in the upper surface US of the seating portion 10.

Here, the "areas in the back surface BS of the seating portion 10 (or the seating body portion 10M)" of the holes 50 (the first holes 51, the second holes 52, the third holes 53, and the fourth holes 54) in the horizontal projection plane are areas of opening of the holes 50 in the back surface BS of the seating portion 10 (or the seating body portion 10M) in the horizontal projection plane. Similarly, the "areas in the upper surface US of the seating portion 10 (or the seating body portion 10M)" of the holes 50 (the first holes 51, the second holes 52, the third holes 53, and the fourth holes 54) in the horizontal projection plane are areas of openings of the holes 50 in the upper surface US of the seating portion 10 (or the seating body portion 10M) in the horizontal projection plane.

Figure 6:
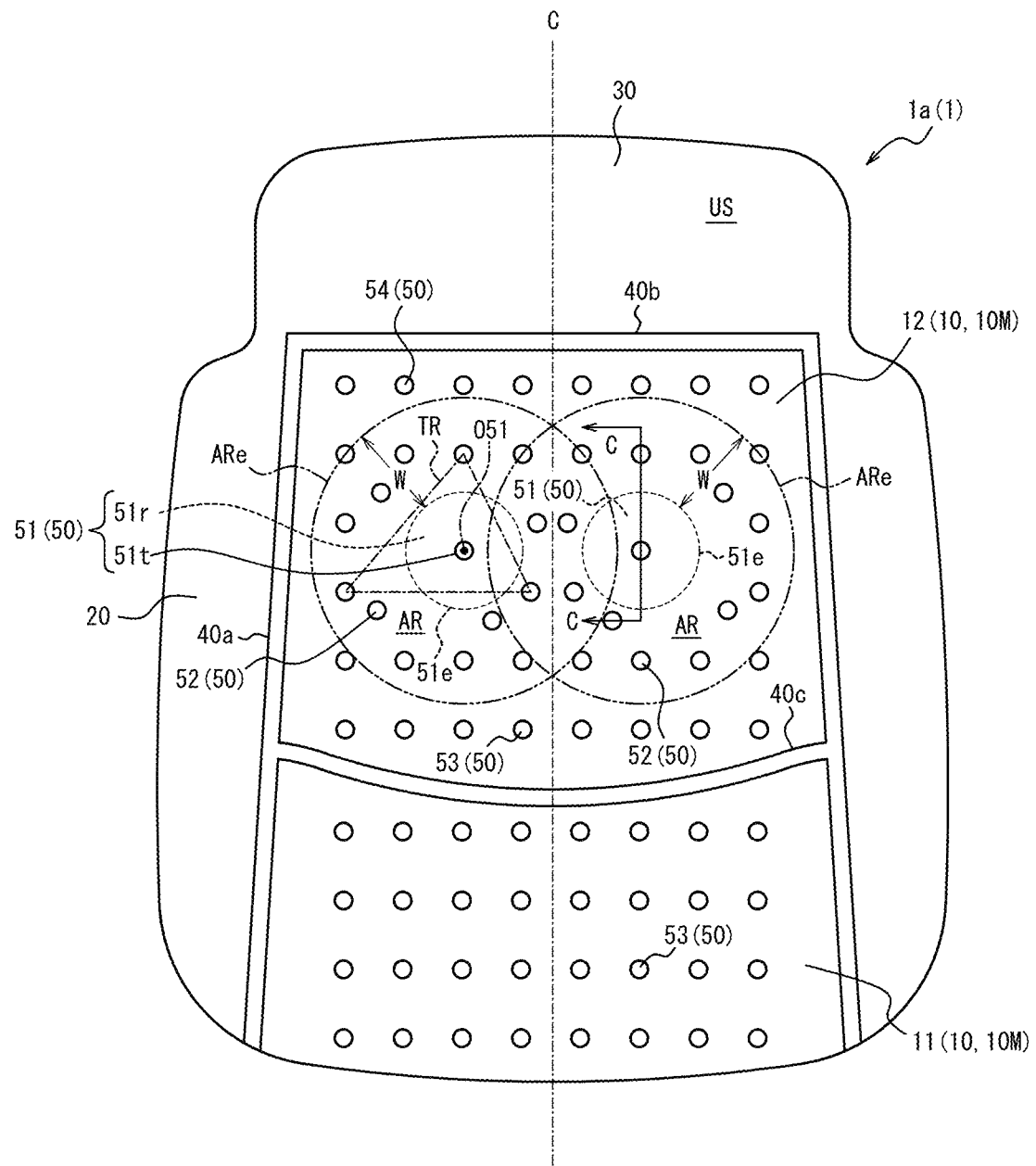
FIG. 6 is a plan view illustrating how a cushion pad according to a third embodiment of the present disclosure looks like when the cushion pad is seen from the upper side.
Figure 7A:
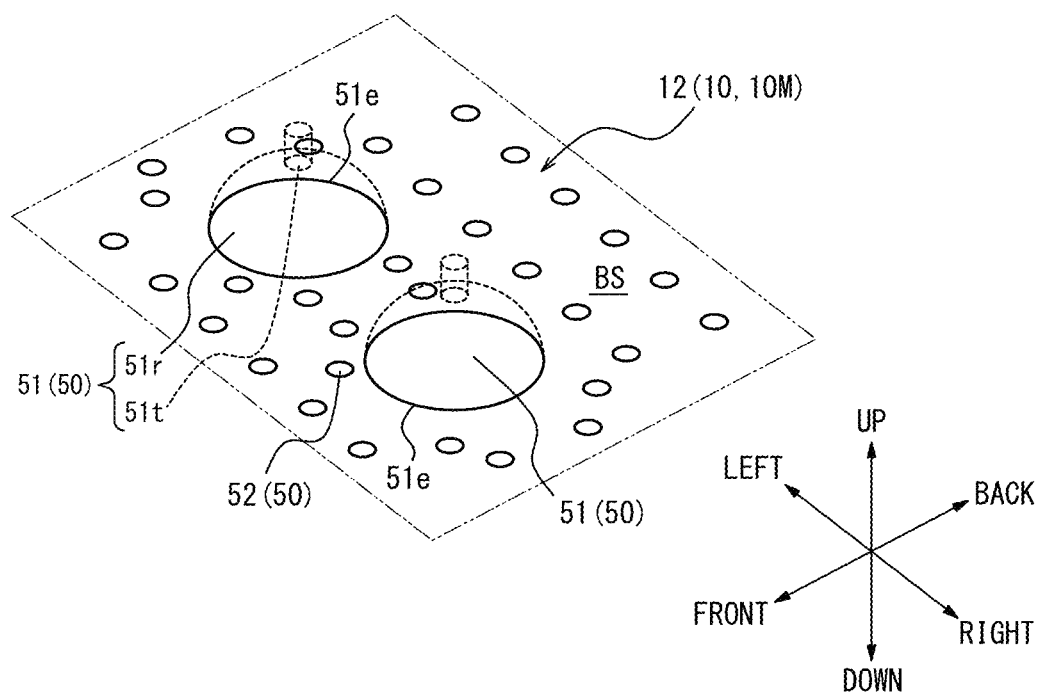
FIG. 7A is a perspective view illustrating a part of a back surface of the cushion pad in FIG. 6.
Figure 7B:
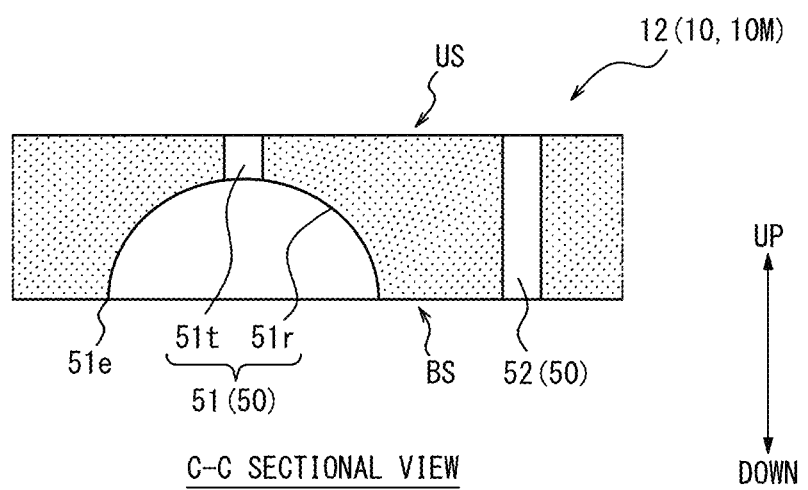
FIG. 7B is a C-C sectional view illustrating a part of the cushion pad in FIG. 6 from a section along the line C-C in FIG. 6.

In the third embodiment illustrated in FIGS. 6 and 7, first holes 51 have bottomed portions 51r that have bottoms and bottomless portions 51t that are bottomless.

The bottomed portions 51r are opened in an upper surface US or a back surface BS (the back surface BS in the illustrated example) of a seating body portion 10M. The bottomless portions 51t have areas that are smaller than the areas of the regions of the bottomed portions 51r surrounded by outer edges 51e, in the horizontal projection plane and are disposed inside the outer edges 51e of the bottomed portions 51r. Therefore, the outer edges 51e of the bottomed portions 51r are also the outer edges 51e of the first holes 51. Although one bottomless portion 51t is provided inside the outer edge 51e of one bottomed portion 51r in the horizontal projection plane in the example in FIGS. 6 and 7, a plurality of bottomless portions 51t may be provided inside the outer edge 51e of one bottomed portion 51r.

According to the third embodiment, it is possible to reduce a sitting pressure immediately below ischial bones of a seated person, to increase a void space rate, and thereby to achieve weight reduction, an improvement in air permeability, reduction of heat storage, and the like as compared with the case in which the entire first holes 51 are bottomed holes as in the first embodiment illustrated in FIGS. 2 and 3, for example.

Also, since the bottomed portions 51r of the first holes 51 are opened in the back surface BS of the seating body portion 10M in the example in FIGS. 6 and 7, the first holes 51 have larger areas in the back surface BS of the seating portion 10 than in the upper surface US of the seating portion 10 in the horizontal projection plane. In this manner, it is possible to reduce the sitting pressure immediately below the ischial bones and to improve sitting comfort by the first holes 51 and to reduce a feeling of discomfort that the seated person may have due to the presence of the first holes 51, as compared with the case in which the areas of the first holes 51 in the back surface BS of the seating portion 10 is equal to or greater than the area in the upper surface US of the seating portion 10.

However, in the third embodiment, the bottomed portions 51r may be opened in the upper surface US of the seating body portion 10M, and thus, the first holes 51 may have smaller areas in the back surface BS of the seating portion 10 than in the upper surface US of the seating portion 10 in the horizontal projection plane.

Note that although the shapes of the bottomed portion 51r and the bottomless portion 51t of each first hole 51 in the horizontal projection plane are circular shapes (perfect circles) in the example in FIGS. 6 and 7, the shapes may be any other arbitrary shapes such as oval shapes or polygonal shapes such as triangular shapes, square shapes, rhomboidal shapes, or trapezoidal shape, for example, in the third embodiment.

Also, the bottomed portions 51r of the first holes 51 have a curved shape projecting upward in the section in the vertical direction and have an area and a diameter gradually decreasing from the back surface BS toward the upper surface US of the seating body portion 10M in the example in FIGS. 6 and 7. However, the bottomed portions 51r of the first holes 51 may have an arbitrary shape in the section in the vertical direction, may have, for example, a substantially triangular shape or a substantially trapezoidal shape projecting upward, and may have an area and a diameter gradually decreasing from the back surface BS toward the upper surface US of the seating body portion 10M. Alternatively, the bottomed portions 51r of the first holes 51 may have a substantially square shape in the section in the vertical direction and may thus have uniform (constant) area and diameter in the up-down direction.

Figure 8:
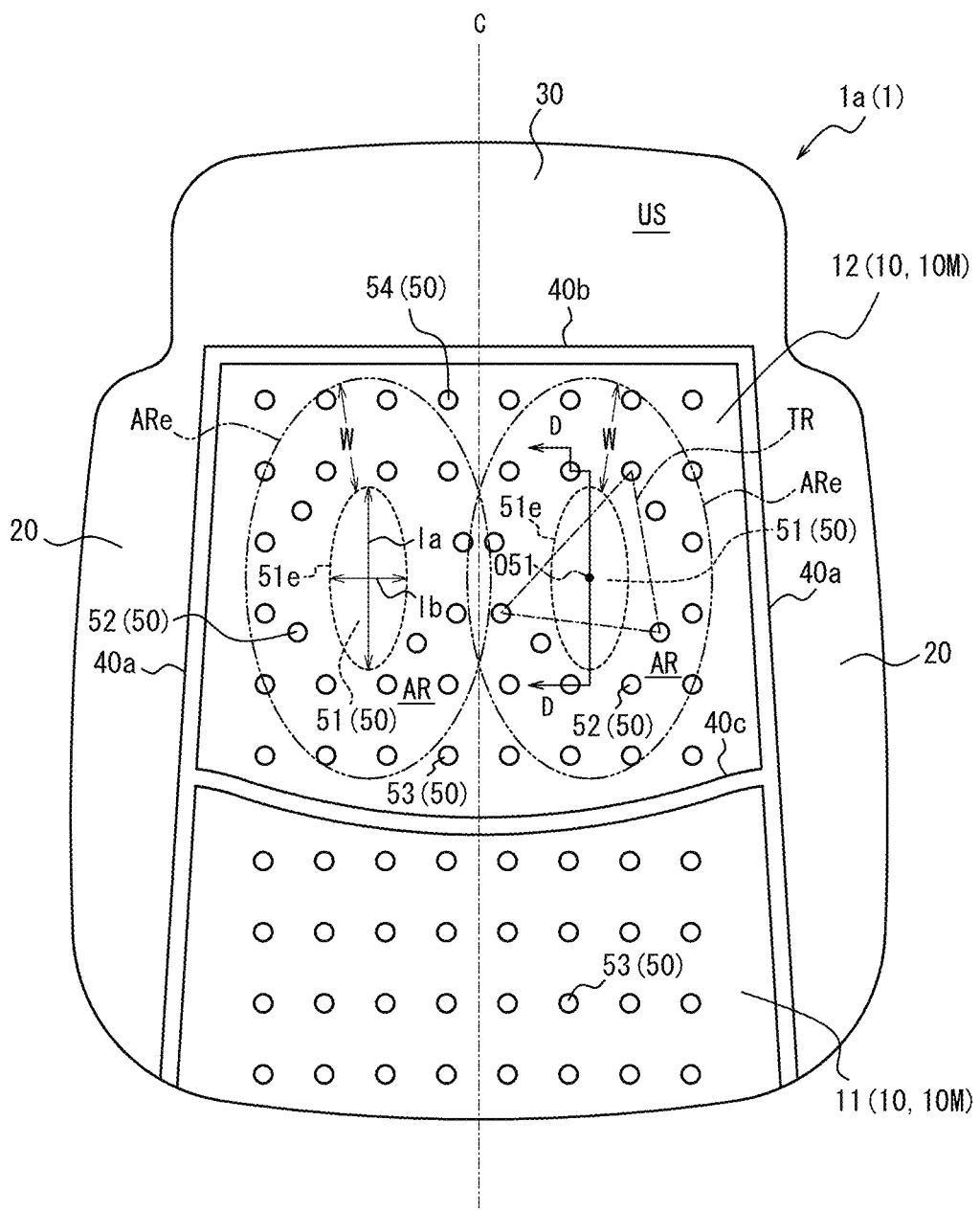
FIG. 8 is a plan view illustrating how a cushion pad according to a fourth embodiment of the present disclosure looks like when the cushion pad is seen from the upper side.
Figure 9A:
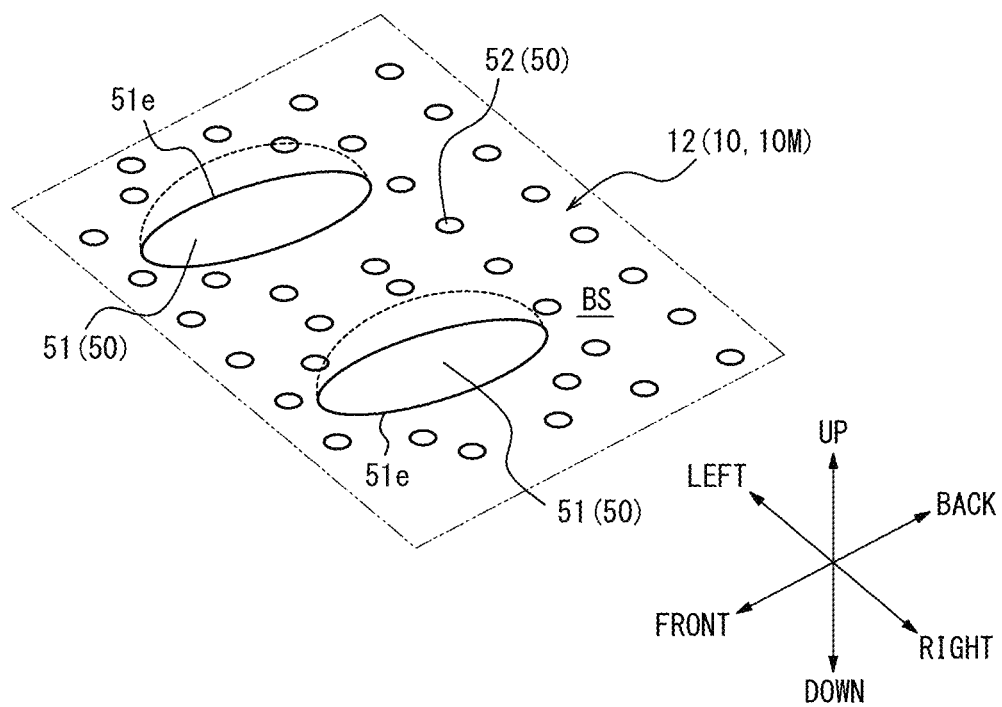
FIG. 9A is a perspective view illustrating a part of a back surface of the cushion pad in FIG. 8.
Figure 9B:
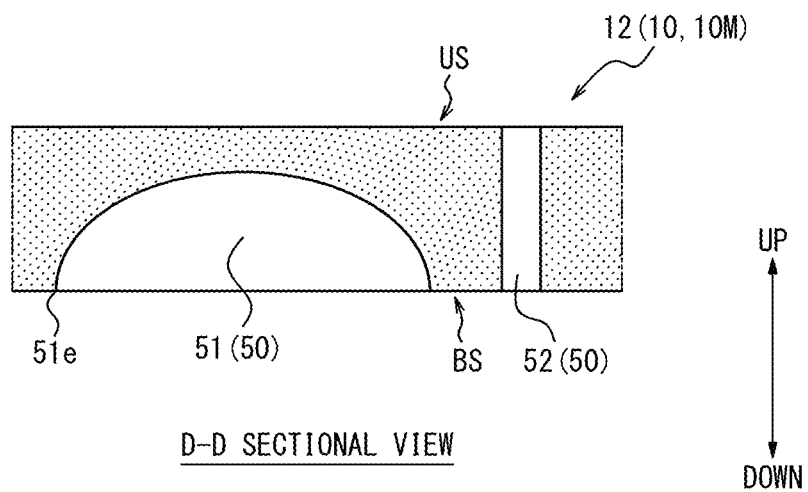
FIG. 9B is a D-D sectional view illustrating a part of the cushion pad in FIG. 8 from a section along the line D-D in FIG. 8.

In the fourth embodiment illustrated in FIGS. 8 and 9, first holes 51 extend to be long in the front-back direction, and in other words, a dimension la thereof in the front-back direction is longer than a dimension $1b$ thereof in the left-right direction ($1a$>$1b$) in the horizontal projection plane.

Generally, in sitting pressure distribution when a seated person is seated in a cushion pad with no holes provided therein, a region with a relatively high sitting pressure at and around ischial bones of the seated person has a shape extending to be long in the front-back direction.

According to the fourth embodiment, it is possible to form the shape of the first holes 51 into a shape along the shape of the region where the sitting pressure is relatively high in the sitting pressure distribution in the horizontal projection plane, thereby to more effectively reduce the sitting pressure immediately below and in the vicinity of the ischial bones, and to improve sitting comfort as compared with a case in which the dimension $1a$ of the first holes 51 in the front-back direction is set to be the same as the dimension $1b$ thereof in the left-right direction ($1a$=$1b$) or a case in which the dimension $1a$ of the first holes 51 in the front-back direction is set to be smaller than the dimension $1b$ thereof in the left-right direction ($1a$<$1b$).

Note that although the shape of each first hole 51 in the horizontal projection plane is an oval shape in the example in FIGS. 8 and 9, the shape may be any other arbitrary shape such as a polygonal shape such as a triangular shape, a square shape, a rhomboidal shape, or a trapezoidal shape, for example, in the fourth embodiment.

Also, the first holes 51 have a curved shape projecting upward in the section in the vertical direction and have an area and a diameter gradually decreasing from the back surface BS to the upper surface US of the seating body portion 10M in the example in FIGS. 8 and 9. However, the first holes 51 may have an arbitrary shape in the section in the vertical direction, may have, for example, a substantially triangular shape or a substantially trapezoidal shape projecting upward, and may have an area and a diameter gradually decreasing from the back surface BS toward the upper surface US of the seating body portion 10M. Alternatively, the first holes 51 may have a substantially square shape in the section in the vertical direction and may thus have a uniform (constant) area and diameter in the up-down direction.

Also, each first hole 51 is a bottomed hole which is opened in the back surface BS of the seating body portion 10M in the example in FIGS. 8 and 9. Thus, similarly to the first embodiment, it is possible to reduce a feeling of discomfort that the seated person may have due to the presence of the first holes 51. However, the first holes 51 may be bottomed holes which are opened in the upper surface US of the seating body portion 10M or may be bottomless holes which penetrate through the seating body portion 10M in the up-down direction in the fourth embodiment.

Figure 10:
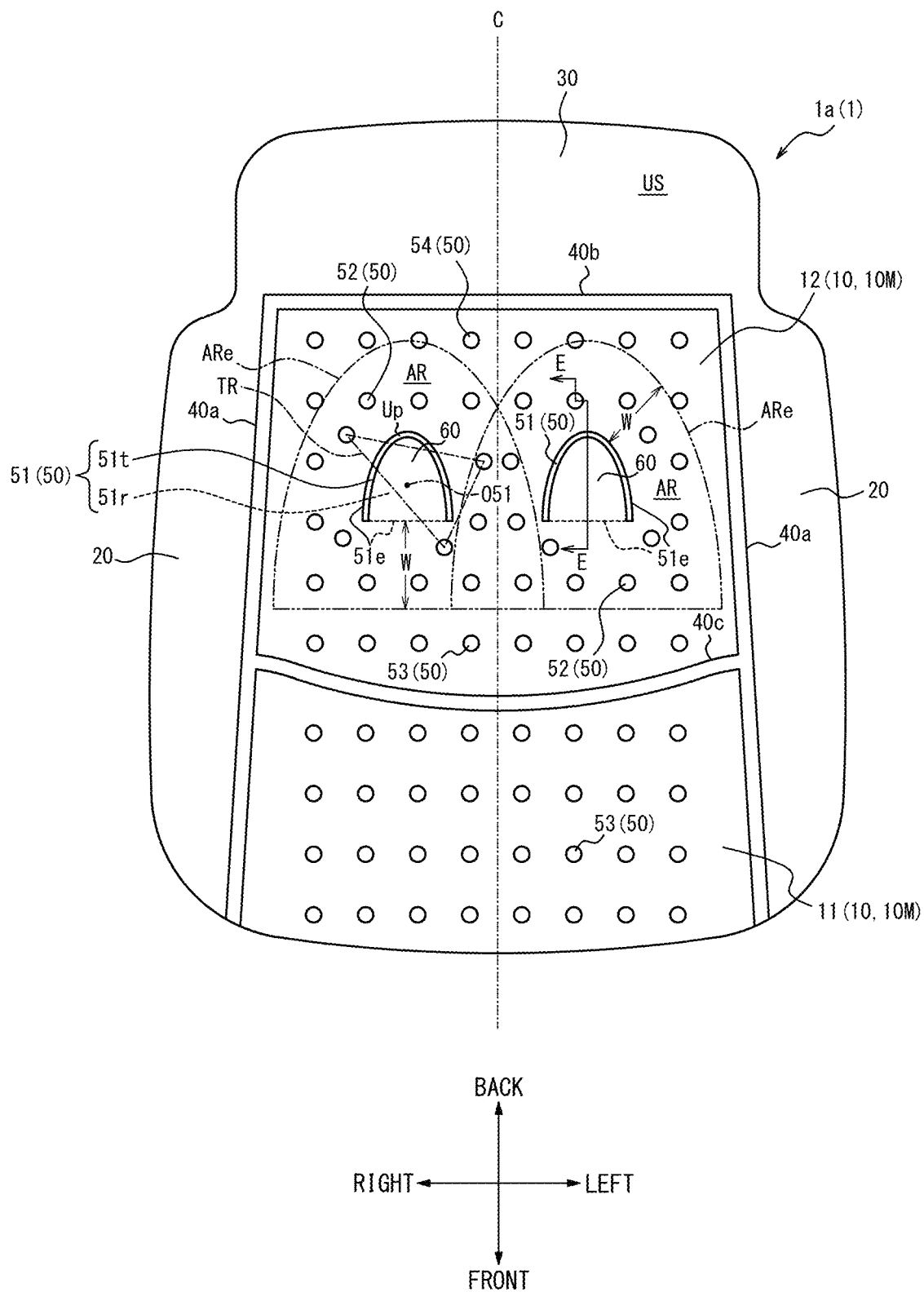
FIG. 10 is a plan view illustrating how a cushion pad according to a fifth embodiment of the present disclosure looks like when the cushion pad is seen from the upper side.
Figure 11A:
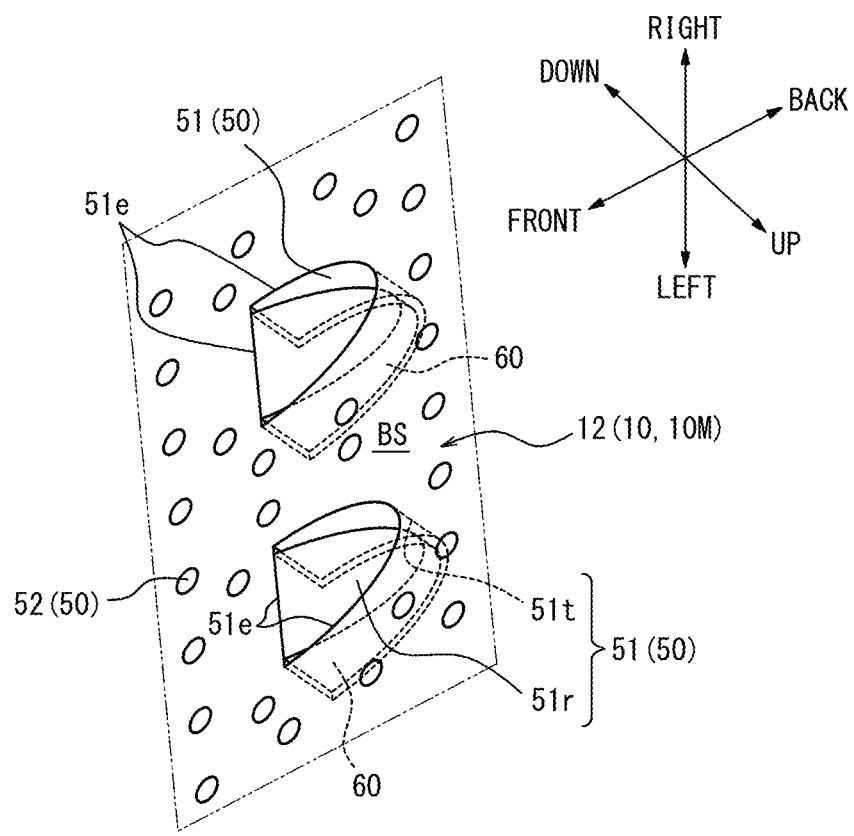
FIG. 11A is a perspective view illustrating a part of a back surface of the cushion pad in FIG. 10.

In the fifth embodiment illustrated in FIGS. 10 and 11, first holes 51 are bottomless holes and include portions extending in substantially a U shape in the horizontal projection plane.

Figure 11B:
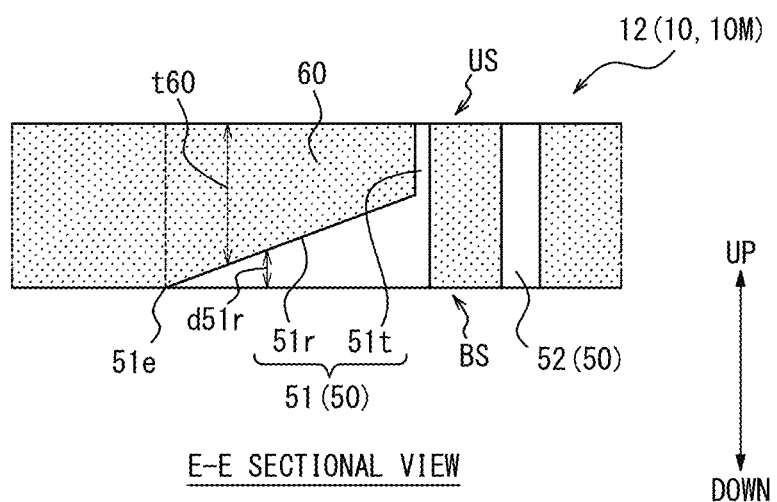
FIG. 11B is an E-E sectional view illustrating a part of the cushion pad in FIG. 10 from a section along the line E-E in FIG. 10.

More specifically, the first holes 51 have bottomed portions 51*r* that have bottoms and bottomless portions 51*t* that are bottomless in the example in FIGS. 10 and 11. The bottomless portions 51*t* are slits penetrating through the seating body portion 10M in the up-down direction and extend in a substantially U shape opened on the front side and projecting on the back side in the horizontal projection plane. The bottomed portions 51*r* are located in regions inside the substantially U shapes formed by the bottomless portions 51*t* in the horizontal projection plane and are opened in the back surface BS of the seating body portion 10M. Also, one-side portions 60 configured with the first resin foam body are sectioned inside the substantially U shapes formed by the bottomless portions 51*t* and above the bottomed portions 51*r*. The one-side portions 60 are coupled only at front ends thereof to remaining parts of the first resin foam body configuring the seating body portion 10M. As illustrated in FIGS. 11B, the bottomed portions 51*r* are formed to have a depth d51*r* gradually increasing toward the back side in the section in the vertical direction. In this manner, the one-side portions 60 have a thickness t60 in the up-down direction gradually decreasing toward the back side. Note that the "depth d51*r*" of the bottomed portions 51*r* is measured in parallel to the up-down direction. The one-side portions 60 configured in this manner can be deformed substantially independently from the first resin foam body around the one-side portions 50, and more specifically, the one-side portions 60 fall down with the front ends of the one-side portions 60 caused to serve as fixed ends like cantilevers, by the ischial bones of the seated person placed on the one-side portions 60 when the seated person is seated.

It is possible to effectively reduce the sitting pressure immediately below the ischial bones and to improve sitting comfort by the first holes 51 in the fifth embodiment as well.

Note that in the fifth embodiment illustrated in FIGS. 10 and 11, projecting portions Up with substantially the U shapes formed by the bottomless portions 51*t* are curved (curved to project on the back side in the example in FIG. 10) in the horizontal projection plane. However, the projecting portions Up with substantially the U shapes formed by the bottomless portions 51*t* may linearly extend (extend in parallel to the left-right direction in the example in FIG. 12) in the horizontal projection plane as in the sixth embodiment illustrated in FIG. 12 instead.

Figure 12:
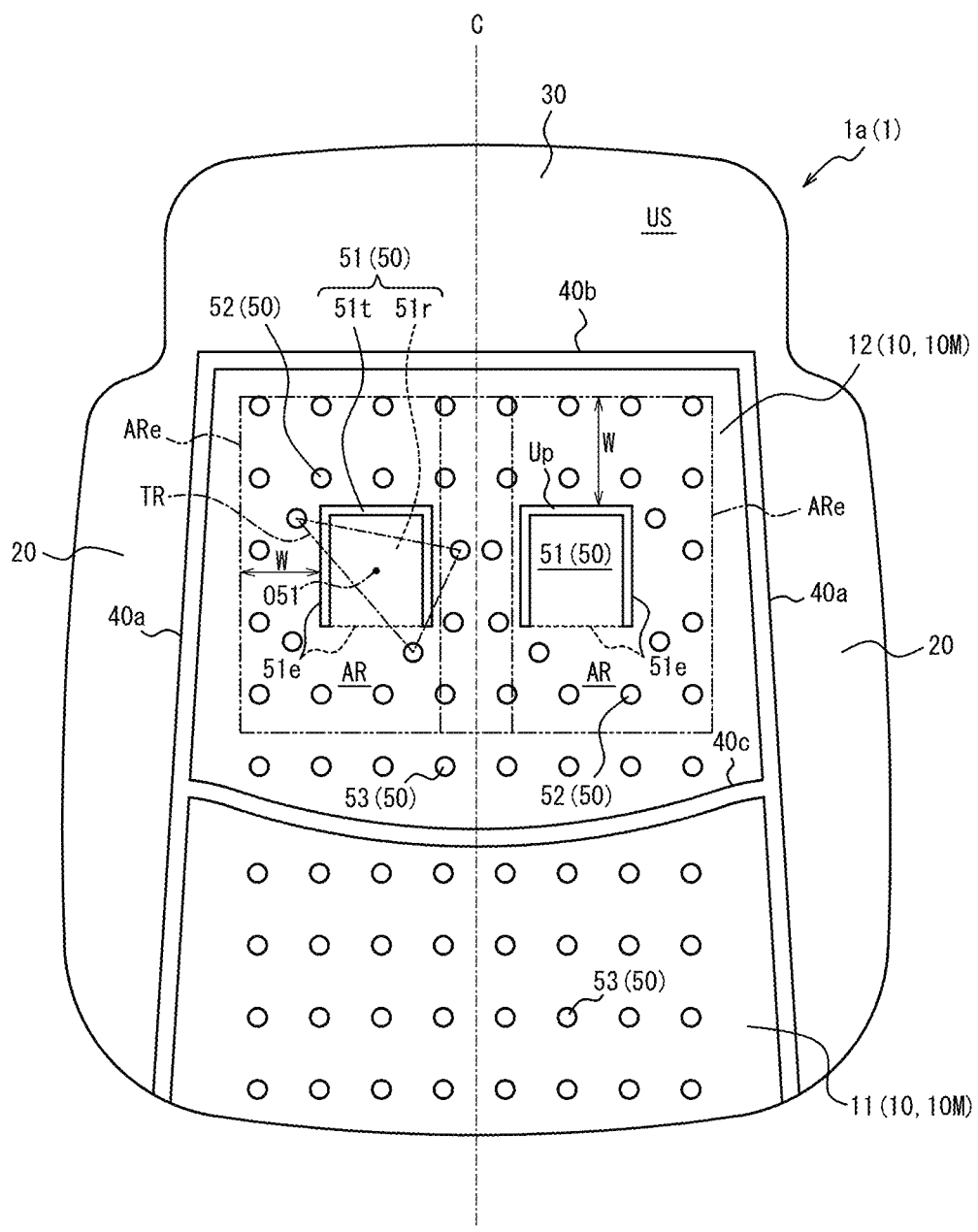
FIG. 12 is a plan view illustrating how a cushion pad according to a sixth embodiment of the present disclosure looks like when the cushion pad is seen from the upper side.
Figure 12:
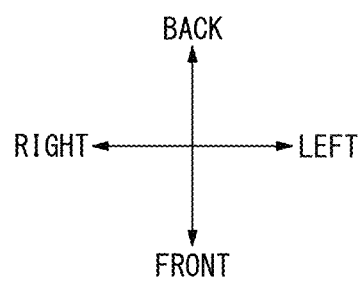

Since the bottomed portions 51*r* are opened in the back surface BS of the seating body portion 10M in the example in FIGS. 10 and 11 and the example in FIG. 12, it is possible to reduce a feeling of discomfort that the seated person may have due to the presence of the first holes 51.

Although wall surfaces of the bottomed portions 51*r* linearly extend in the sections in the vertical direction in the example in FIGS. 10 and 11 and the example in FIG. 12, the wall surfaces may extend in a curved shape projecting downward or in a curved shape projecting upward instead. Also, although the bottomed portions 51*r* are formed to have the depth d51*r* gradually increasing toward the back side in the example in FIGS. 10 and 11 and the example in FIG. 12, the depth d51*r* of the bottomed portions 51*r* may be uniform over the entire bottomed portions 51*r*.

Also, although the bottomless portions 51*t* extend substantially in the U shapes opened on the front side and projecting on the back side in the horizontal projection plane in the example in FIGS. 10 and 11 and the example in FIG. 12, the direction of the substantially U shapes formed by the bottomless portions 51*t* in the horizontal projection plane may be an arbitrary direction, may project on the front side, and may be opened on the back side, for example.

In the example in FIGS. 10 and 11 and the example in FIG. 12, the first holes 51 may have only the bottomless portions 51*t* without the bottomed portions 51*r*.

In each of the aforementioned examples, the inside of the first holes 51 is void spaces. However, in each of the aforementioned examples, the soft material portions 10S formed of a second resin foam body that is softer than the first resin foam body configuring the seating body portion 10M may be arranged inside the first holes 51 in the seating body portion 10M as in the seventh embodiment illustrated in FIG. 13 and the eight embodiment illustrated in FIG. 14. In this case, the seating portion 10 includes the seating body portion 10M and the soft material portion 10S. In the example illustrated in FIG. 13, first holes 51 are bottomed holes which are opened in the back surface BS of the seating body portion 10M, and the soft material portions 10S are arranged inside the first holes 51. In the example illustrated in FIG. 14, first holes 51 are bottomless holes which penetrate through the seating body portion 10M in the up-down direction, and the soft material portion 10S are arranged inside the first holes 51. However, the first holes 51 may be bottomed holes which are opened in the upper surface US of the seating body portion 10M, and the soft material portion 10S may be arranged inside the first holes 51.

Note that in a case in which the first resin foam body configuring the seating body portion 10M has different compositions and foaming rates (and thus hardness) depending on parts of the seating body portion 10M, the second resin foam body is softer than the softest part of the first resin foam body.

The hardness of each of the first resin foam body and the second resin foam body is measured in accordance with the "method D" in "JIS K 6400-2: 2012 6.1 Test Types".

The soft material portion 10S may be configured separately from the seating body portion 10M or may be configured integrally with the seating body portion 10M.

It is possible to reduce the sitting pressure and to improve sitting comfort in this case as well similarly to the first to sixth embodiments in which the inside of the first holes 51 is void spaces though there may be some level differences.

In each of the aforementioned examples, the seating body portion 10M has the two first holes 51 that are separated from each other in the left-right direction and are arrange on both sides of the center line C of the seating portion 10 in the left-right direction. However, the seating body portion 10M may have only one first hole 51 as in the ninth embodiment illustrated in FIG. 15. In this case, it is only necessary for the first hole 51 to be arranged to lie across the center line C of the seating portion 10 in the left-right direction (that is, to be located on the center line C of the seating portion 10 in the left-right direction).

Figure 15:
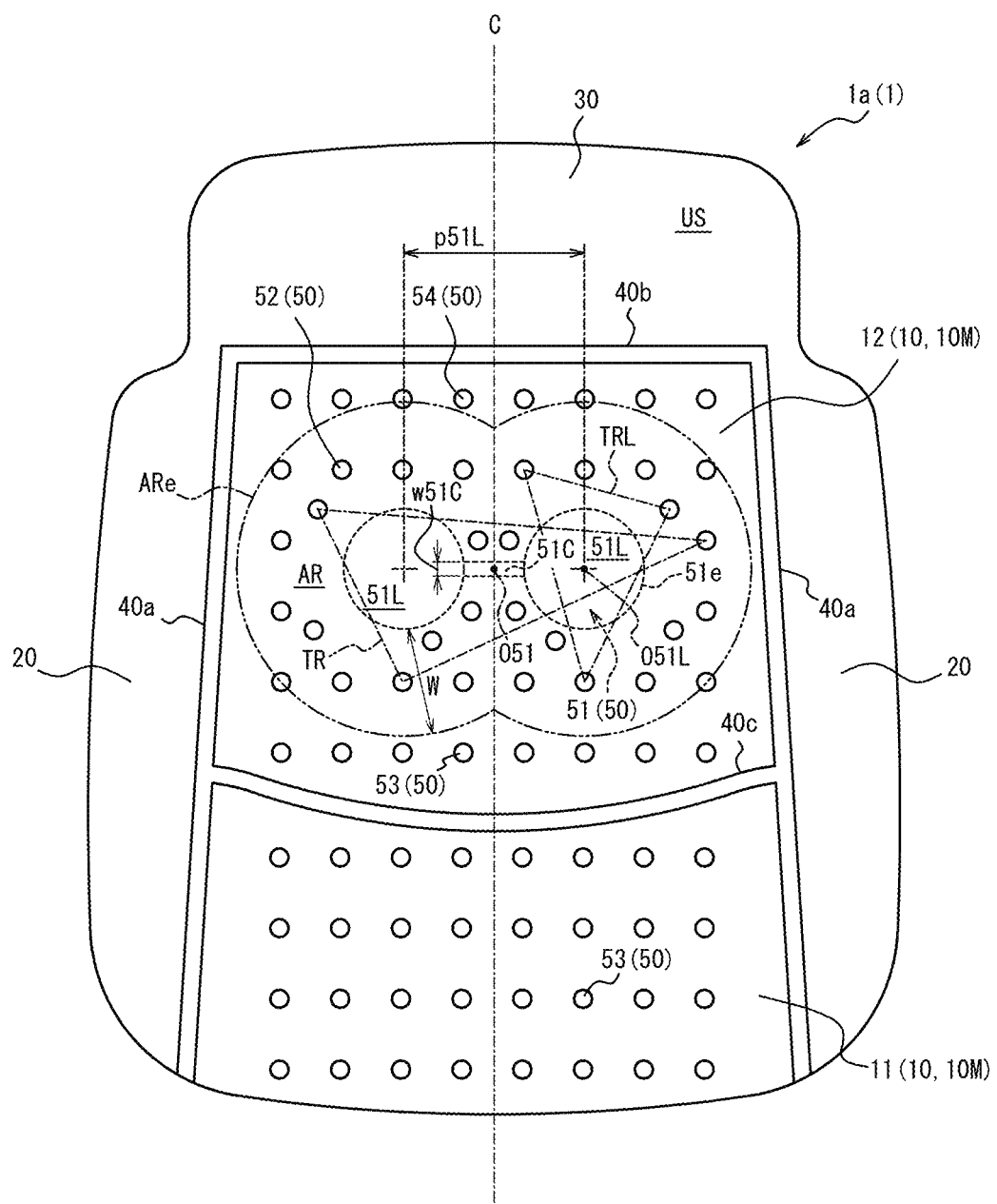
FIG. 15 is a plan view illustrating how a cushion pad according to a ninth embodiment of the present disclosure looks like when the cushion pad is seen from the upper side.

More specifically, in the example in FIG. 15, the first hole 51 includes two bottomless or bottomed large region portions 51L arranged on both sides of the center line C of the seating portion 10 in the left-right direction and a bottomless or bottomed coupling portion 51c coupling the two large region portions 51L and extending in the left-right direction to lie across the center line C of the seating portion 10 in the left-right direction. Each large region portion 51L preferably has a configuration that is similar to that of the first holes 51 in the aforementioned first to eighth embodiments. In the example in FIG. 15, a width w51C of the coupling portion 51C is set to be smaller than the diameter of the large region portions 51L. In this manner, it is possible to curb excessive sinking of the buttocks of the seated person and to improve sitting comfort as compared with a case in which the width w51C of the coupling portion 51C is set to be equal to or greater than the diameter of the large region portions 51L.

Here, the "diameter" of the large region portions 51L indicates the diameter of the circumscribed circles of the large region portions 51L in the horizontal projection plane in a case in which the large region portions 51L have a non-circular shape in the horizontal projection plane.

Also, a center point O51L of each large region portion 51L is preferably located on or inside a triangle TRL obtained by connecting center points of any three second holes 52 (preferably, any three second holes 52 in the annular region AR).

Here, the "center point" of the large region portion 51L indicates the center point of the circumscribed circle of the large region portion 51L in the horizontal projection plane in a case in which the large region portion 51L has a non-circular shape in the horizontal projection plane.

In a case in which the seating body portion 10M has the two first holes 51 that are separated from each other in the left-right direction and are arranged on both sides of the center line C of the seating portion 10 in the left-right direction as in each of the examples in FIGS. 2 to 12, the diameter of the first holes 51 is preferably 30 to 100 mm and is more preferably 40 to 80 mm in the horizontal projection plane in terms of reduction of the sitting pressure immediately below the ischial bones and an improvement in sitting comfort. From a similar viewpoint, the area of the first holes 51 is preferably 706 to 7850 mm$^2$ and is more preferably 1256 to 5024 mm$^2$ in the horizontal projection plane.

Similarly, in a case in which the seating body portion 10M has only the one first hole 51 arranged to lie across the center line C of the seating portion 10 in the left-right direction, and the first hole 51 has the two large region portions 51L that are separated from each other in the left-right direction and are arranged on both sides of the center line C of the seating portion 10 in the left-right direction and the coupling portion 51C that couples the two large region portions 51L as in the example in FIG. 15, the diameter of the large region portions 51L is preferably 30 to 100 mm and is more preferably 40 to 80 mm in the horizontal projection plane in terms of reduction of the sitting pressure immediately below the ischial bones and an improvement in sitting comfort. From a similar viewpoint, the area of the large region portions 51L is preferably 706 to 7850 mm$^2$ and is more preferably 1256 to 5024 mm$^2$ in the horizontal projection plane.

In a case in which the seating body portion 10M has the two first holes 51 that are separated from each other in the left-right direction and are arranged on both sides of the center line C of the seating portion 10 in the left-right direction as in each of the examples in FIGS. 2 to 12, a distance p51 (FIG. 2) between the centers of the first holes 51 in the left-right direction is preferably 60 to 160 mm and is more preferably 70 to 150 mm in the horizontal projection plane in terms of reduction of the sitting pressure immediately below the ischial bones and an improvement in sitting comfort. Here, the "centers" of the first holes 51 indicate the centers of the circumscribed circles of the first holes 51 in the horizontal projection plane in a case in which the first holes 51 have a non-circular shape in the horizontal projection plane.

Similarly, in a case in which the seating body portion 10M has only one first hole 51 arranged to lie across the center line C of the seating portion 10 in the left-right direction, and the first hole 51 has the two large region portions 51L that are separated from each other in the left-right direction and are arranged on both sides of the center line C of the seating portion 10 in the left-right direction and the coupling portion 51C coupling the two large region portions 51L as in the example in FIG. 15, a distance p51L (FIG. 15) between the centers of the large region portions 51L in the left-right direction is preferably 60 to 160 mm and is more preferably 70 to 150 mm in the horizontal projection plane in terms of reduction of the sitting pressure immediately below the ischial bones and an improvement in sitting comfort.

Here, the "centers" of the large region portions 51L indicate the centers of the circumscribed circles of the large region portions 51L in the horizontal projection plane in a case in which the large region portions 51L have a non-circular shape in the horizontal projection plane.

In a case in which the first holes 51 are bottomed holes as in each of the examples in FIGS. 2 and 3, FIGS. 8 and 9, FIG. 13, and FIG. 15, the depth d51 (FIG. 3B) of the first holes 51 is preferably 20% or more, and is more preferably 30% or more of the maximum value of the thickness T (FIG. 3B) of the cushion pad 1a in the up-down direction in terms of reduction of the sitting pressure immediately below the ischial bones and an improvement in sitting comfort. On the other hand, the depth d51 of the first holes 51 is preferably 80% or less, and is more preferably 70% or less of the maximum value of the thickness T of the cushion pad 1a in the up-down direction in terms of prevention of breakage such as hole opening from the first holes 51 during utilization of the cushion pad 1a.

Note that the "depth d51" of the first holes 51 indicates the depth at a deepest position of the first holes 51 when the depth is measured in parallel to the up-down direction.

In each of the aforementioned examples, the diameter of the second holes 52 is preferably 5 to 35 mm and is more preferably 10 to 30 mm in the horizontal projection plane in terms of reduction of the sitting pressure in the surroundings of the ischial bones and an improvement in sitting comfort. From a similar viewpoint, the area of the second holes 52 is preferably 19 to 962 mm$^2$ and is more preferably 78 to 707 mm$^2$ in the horizontal projection plane.

In a case in which the third holes 53 and/or the fourth holes 54 are provided in the seating body portion 10M in each of the aforementioned examples, the diameters of the third holes 53 and the fourth holes 54 are preferably 5 to 35 mm and are more preferably 10 to 30 mm in the horizontal projection plane in terms of reduction of the sitting pressure when the seated person is seated and an improvement in sitting comfort. From a similar viewpoint, the areas of the third holes 53 and the fourth holes 54 are preferably 19 to 962 mm$^2$ and are more preferably 78 to 707 mm$^2$ in the horizontal projection plane.

The holes 50 are preferably provided more densely inside the annular regions AR than outside the annular regions AR as illustrated in FIG. 2 and the like in terms of reduction of the sitting pressure in the surroundings of the ischial bones and an improvement in sitting comfort.

From such a viewpoint, a distance 152 (FIG. 2) between a pair of second holes 52 that are located closest to each other from among the three or more second holes 52 is preferably smaller than a distance 153 (FIG. 2) between a pair of third holes 53 that are located closest to each other from among the plurality of third holes 53 (152<153) in the horizontal projection plane as illustrated in FIG. 2 and the like.

Here, the "distance 152" between the second holes 52 is the distance between outer edges of the pair of second holes 52 at the position at which the outer edges of the pair of second holes 52 that are adjacent to each other are located closest to each other in the horizontal projection plane. The "distance 153" between the third holes 53 is the distance between outer edges of the pair of third holes 53 at the position at which the outer edges of the pair of third holes 53 that are adjacent to each other are located closest to each other in the horizontal projection plane.

Also, a ratio RAR (RAR=A52×100/AAR [%]) of the total area A52 of the second holes 52 with respect to the entire area AAR of the annular regions AR is preferably higher than a ratio RO (RO=A534×100/AO [%]) of a total area A534 of the third holes 53 and the fourth holes 54 with respect to the entire area AO of the region outside the annular regions AR in the seating portion 10 (RAR>RO) in the horizontal projection plane in terms of reduction of the sitting pressure in the surroundings of the ischial bones and an improvement in sitting comfort.

Here, the "entire area AAR of the annular areas AR" in the horizontal projection plane indicates the area of the entire regions sectioned between the outer edges 51e of the first holes 51 and outer edges ARe of the annular regions AR in the horizontal projection plane and also includes the area occupied by the second holes 52. In a case in which there are two annular regions AR as in the examples in FIG. 2 and the like, the ratio RAR is calculated for only one of the annular regions AR. The "total area A52 of the second holes 52" also includes the entire area of the second holes 52 on the outer edges ARe of the annular regions AR.

The "entire area AO of the region outside the annular regions AR in the seating portion 10" in the horizontal projection plane indicates the area of the entire region sectioned between the outer edge of the seating portion 10 and the outer edges ARe of the annular regions AR in the horizontal projection plane and also includes the areas occupied by the third holes 53 and the fourth holes 54. In a case in which there are two annular regions AR as in the examples in FIG. 2 and the like, the "entire area AO of the region outside the annular regions AR in the seating portion 10" is calculated for only the region outside the outer edges ARe of both the annular regions AR.

The ratio RAR of the total area A52 of the second holes 52 in the annular regions AR with respect to the entire area AAR of the annular regions AR is preferably 5 to 25% and is more preferably 8 to 23% in the horizontal projection plane in terms of reduction of the sitting pressure in the surroundings of the ischial bones and an improvement in sitting comfort.

The ratio RO of the total area A534 of the third holes 53 and the fourth hole 54 with respect to the entire area AO of the region outside the annular regions AR in the seating portion 10 is preferably 1 to 20% and is more preferably 3 to 18% in terms of reduction of the sitting pressure outside the surroundings of the ischial bones and an improvement in sitting comfort.

A density DAR (DAR=N52/AAR [holes/mm$^2$]) of the number N52 of the second holes 52 with respect to the entire area AAR of the annular regions AR is preferably higher than a density DO (DO=N534/A0 [holes/mm2]) of the total number N534 of the third holes 53 and the fourth holes 54 with respect to the entire area A0 of the region outside the annular regions AR in the seating portion 10 (DAR>DO) in the horizontal projection plane in terms of reduction of the sitting pressure in the surroundings of the ischial bones and an improvement in sitting comfort.

Here, the "number N52 of the second holes 52" include the number of second holes 52 located on the outer edges ARe of the annular regions AR.

In the examples illustrated in FIG. 2 and the like, the second holes 52 are arranged in non-uniform arrangement patterns in the horizontal projection plane. However, the arrangement pattern of the second holes 52 may be an arbitrary arrangement pattern and may be a uniform arrangement pattern, for example, and more specifically, the second holes 52 may be aligned at constant pitch intervals in each of the left-right direction and the front-back direction, in the horizontal projection plane.

In the examples illustrated in FIG. 2 and the like, the third holes 53 and the fourth holes 54 are arranged in uniform arrangement patterns and are aligned at constant pitch intervals in each of the left-right direction and the front-back direction in the horizontal projection plane. However, each of the arrangement patterns of the third holes 53 and the fourth holes 54 may be an arbitrary arrangement pattern and may be a non-uniform arrangement pattern in the horizontal projection plane.

Here, the "pitch intervals" between the holes 50 (the first holes 51, the second holes 52, the third holes 53, and the fourth holes 54) are intervals between centers of a pair of holes 50 that are adjacent to each other in the horizontal projection plane.

In each of the aforementioned examples, a ratio RW (RW=W2×100/W1 [%]) of a total weight W2 of the actual cushion pad 1*a* including the holes 50 (and further the soft material portions 10S in a case in which the soft material portions 10S are included) with respect to a total weight W1 of the cushion pad 1*a* in a case in which there are no holes 50 in the cushion pad la (the holes 50 are filled with the first resin foam body) is preferably 97% or less and is more preferably 92% or less in terms of an improvement in sitting comfort, weight reduction, an improvement in air permeability, and reduction of heat storage. On the other hand, the aforementioned ratio RW is preferably 70% or more and is more preferably 75% or more in terms of an improvement in sitting comfort.

In a case in which each of the second holes 52, the third holes 53, or the fourth holes 54 that may be provided in the seating body portion 10M is a bottomed hole in each of the aforementioned examples, the depth (the length in the up-down direction) of the second holes 52, the third holes 53, or the fourth holes 54 is preferably 30% or more and less than 100% of the thickness (the length in the up-down direction) of the seating body portion 10M.

EXAMPLES

Next, an example and comparative examples of the cushion pad according to the present disclosure will be described with reference to FIGS. 16 and 17.

Comparative Example 1 and Example 1

Figure 16:
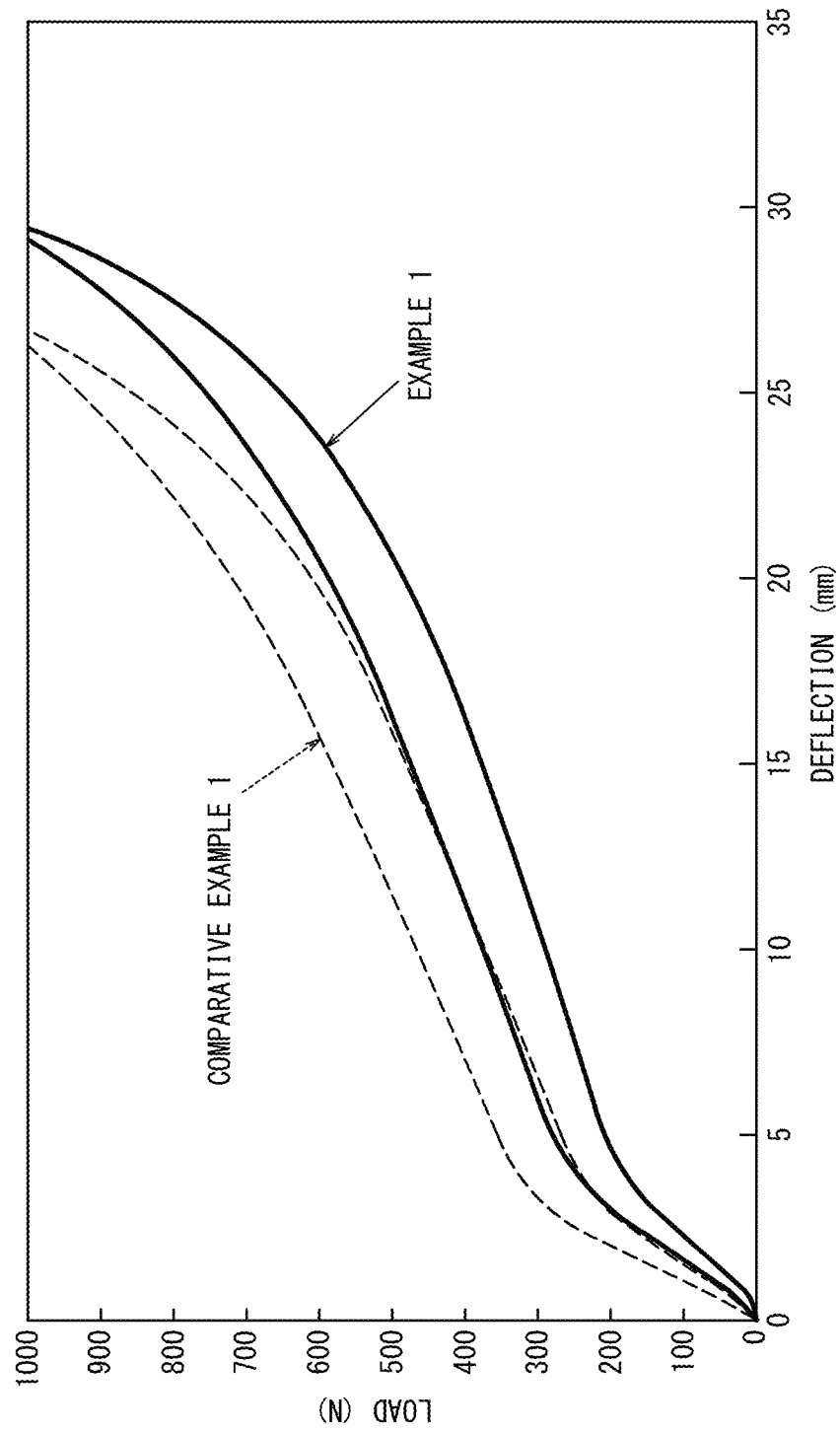
FIG. 16 is a diagram illustrating test results of cushion pads in Example 1 and Comparative Example 1 of the present disclosure.

FIG. 16 illustrates results (compression deflection curves) of carrying out a compression test on cushion pads according to Comparative Example 1 and Example 1 of the present disclosure. As for the compression deflection curves in FIG. 16, the horizontal axis represents deflection (mm) in the up-down direction, and the vertical axis represents a load (N). In the compression test, a load was applied to each of test pieces in Comparative Example 1 and Example 1 in the up-down direction (thickness direction) to compress the test pieces.

The test pieces in Comparative Example 1 and Example 1 had the same dimensions of the outer shapes and the same material. The material of configuring both the test pieces in Comparative Example 1 and Example 1 was polyurethane foam. The maximum value of the thickness of each of the test pieces in Comparative Example 1 and Example 1 in the up-down direction was 50 mm, that is, the test pieces were formed to be thin.

The test piece in Comparative Example 1 did not have any holes 50 at all.

On the other hand, the test piece in Example 1 had a plurality of holes 50, and the plurality of holes 50 were arranged in the arrangement pattern in the example in FIG. 2. In other words, the test piece in Example 1 had two first holes 51, three or more second holes 52 in the annular regions AR, and third holes 53 and fourth holes 54 outside the annular regions AR. Also, each first hole 51 was located inside a triangle TR obtained by connecting the centers of any three second holes 52.

As for the compression deflection curves in FIG. 16, the upper curve represents a curve during compression while the lower curve represents a curve at the time of restoration. As can be ascertained from FIG. 16, the test piece in Example 1 can be largely deflected during the compression, and inclination during application of a high load is mild as compared with Comparative Example 1. Therefore, Example 1 provides less feeling of bottoming, more satisfactory feeling of stroke, and more excellent sitting comfort as compared with Comparative Example 1.

Comparative Example 2 and Example 1

Figure 17:
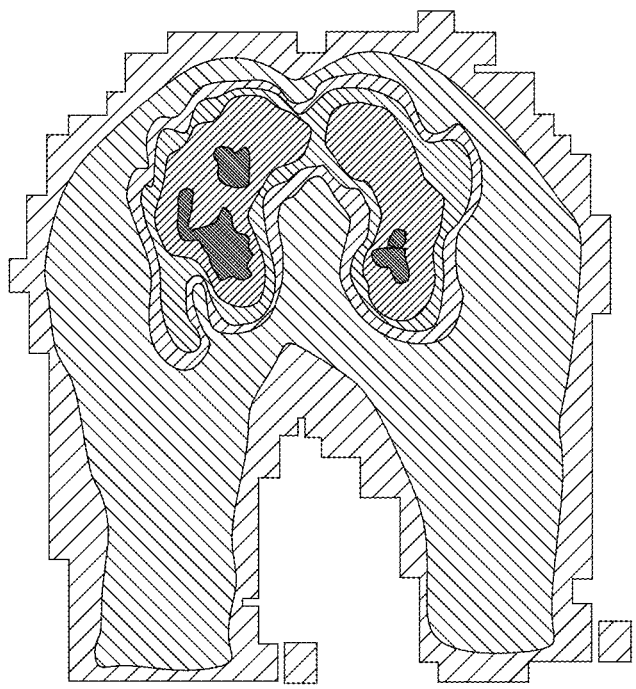
FIG. 17 is a diagram illustrating test results of cushion pads in Example 1 and Comparative Example 2 of the present disclosure.
Figure 17:
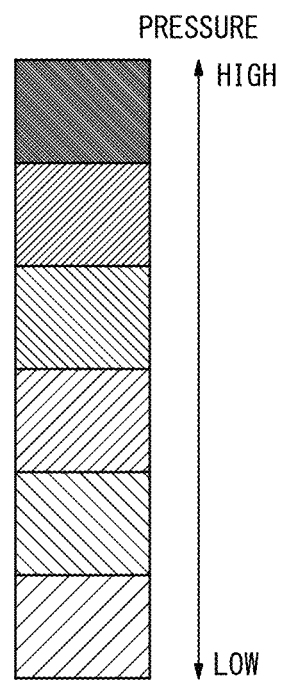
Figure 17:
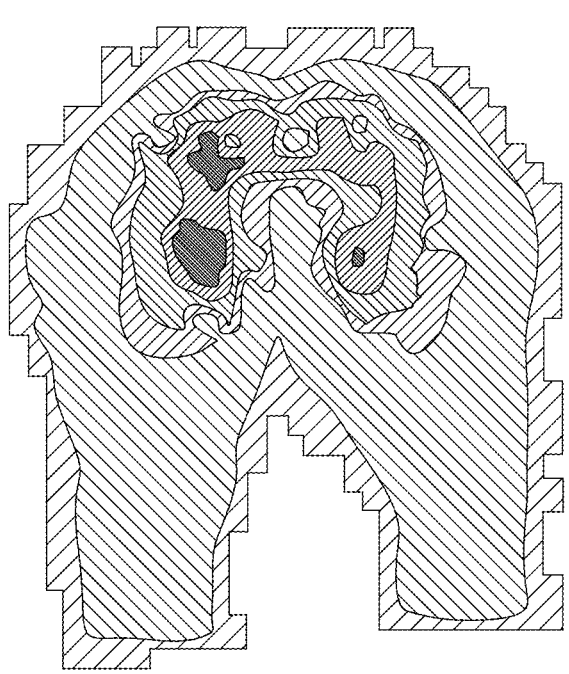
Figure 17:
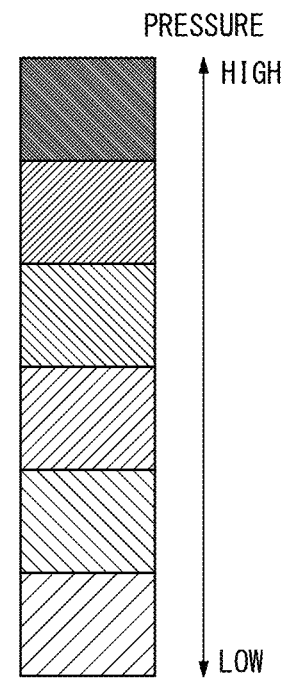

FIG. 17 illustrates sitting pressure distribution obtained when the same testing person was seated in each of cushion pads according to Comparative Example 2 and Example 1 of the present disclosure.

FIG. 17A illustrates sitting pressure distribution in Comparative Example 2 while FIG. 17B illustrates sitting pressure distribution in Example 1. In FIG. 17, the sitting pressure distribution is illustrated by a plurality of types of hatching, and each type of hatching indicates a mutually different pressure range (rather than a pressure value at one point).

The test pieces in Comparative Example 2 and Example 1 had the same dimensions of outer shapes and the same material.

The test piece in Example 1 is the same as that in Example 1 used in the test in FIG. 16, and the configuration thereof is as described above.

The test piece in Comparative Example 2 was different from that in Example 1 in that, of the holes 50, the test piece in Comparative Example 2 had only a pair of first holes 51 and did not have the second holes 52, the third holes 53, and the fourth holes 54.

As can be ascertained from FIG. 17, Example 1 can further disperse the load applied to the surroundings of the pair of ischial bones of the seated person, can reduce the sitting pressure and thus a feeling of tension in the surroundings of the ischial bones, and can improve sitting comfort as compared with Comparative Example 2.

INDUSTRIAL APPLICABILITY

The cushion pad according to the present disclosure can be suitably used in a seat pad for a vehicle. Also, the cushion pad according to the present disclosure can be used in an arbitrary type of vehicle.

REFERENCE SIGNS LIST

1 Seat pad for vehicle (seat pad)
1*a* Cushion pad
10 Seating portion (main pad portion)
11 Below-thigh portion
12 Below-buttocks portion
10M Seating body portion
10S Soft material portion
20 Side pad portion
30 Back pad facing portion
40*a*, 40*b*, 40*c* Groove
1*b* Back pad
50 Hole 51 First hole (hole)
O51 Center point of first hole
51e Outer edge of first hole
51r Bottomed portion
51t Bottomless portion
51L Large region portion
O51L Center point of large region portion
51C Coupling portion
52 Second hole (hole)
53 Third hole (hole)
54 Fourth hole (hole)
60 One-side portion
100 Seat for vehicle
101 Surface skin
102 Headrest
US Upper surface
BS Back surface
C Center line in left-right direction
TR, TRL Triangle
AR Annular region
ARe Outer edge of annular region
W Width of annular region
Up projecting portion with substantially U shape formed by first hole in horizontal projection plane

The invention claimed is:

1. A cushion pad comprising:
a seating portion configured to support a seated person,
wherein the seating portion has a seating body portion formed of a first resin foam body,
the seating body portion includes
a bottomless or bottomed first hole arranged at a position at which the first hole overlaps a pair of ischial bones of the seated person in a horizontal projection plane, and
three or more bottomless or bottomed second holes with areas that are smaller than an area of the first hole in the horizontal projection plane,
a center point of the first hole is located inside a triangle obtained by connecting center points of any three second holes from among the three or more second holes in the horizontal projection plane, and
in the seating portion,
inside of the first hole is a void space, or
a soft material portion formed of a second resin foam body that is softer than the first resin foam body is arranged inside the first hole,
the second holes have areas equal to each other in the horizontal projection plane, and
the three or more second holes are arranged inside an annular region with a width of 80 mm surrounding outside of an outer edge of the first hole in the horizontal projection plane.

2. The cushion pad according to claim 1, wherein the first hole is a bottomed hole and is opened in a back surface of the seating portion.

3. The cushion pad according to claim 2, wherein a maximum value of a thickness of the cushion pad in an up-down direction is 70 mm or less.

4. The cushion pad according to claim 2,
wherein the seating body portion has the two first holes that are separated from each other in a left-right direction, and
a diameter of the first holes is 30 to 100 mm in the horizontal projection plane.

5. The cushion pad according to claim 2, wherein a dimension of the first hole in a front-back direction is longer than a dimension in a left-right direction in the horizontal projection plane.

6. The cushion pad according to claim 1, wherein the first hole is a bottomless hole and has an area that is greater in a back surface of the seating portion than in an upper surface of the seating portion.

7. The cushion pad according to claim 1, wherein a maximum value of a thickness of the cushion pad in an up-down direction is 70 mm or less.

8. The cushion pad according to claim 1,
wherein the seating body portion has the two first holes that are separated from each other in a left-right direction, and
a diameter of the first holes is 30 to 100 mm in the horizontal projection plane.

9. The cushion pad according to claim 1, wherein a dimension of the first hole in a front-back direction is longer than a dimension in a left-right direction in the horizontal projection plane.

10. The cushion pad according to claim 1, wherein the first hole is a bottomless hole and includes a portion extending a substantially U shape in the horizontal projection plane.

11. The cushion pad according to claim 1, wherein a diameter of the second holes is 5 to 35 mm in the horizontal projection plane.

12. The cushion pad according to claim 1, wherein the seating body portion further has a bottomless or bottomed third hole arranged on a front side beyond the annular region in the horizontal projection plane.

* * * * *